(12) United States Patent
Blevins

(10) Patent No.: US 11,684,820 B2
(45) Date of Patent: Jun. 27, 2023

(54) COMPUTER IMPLEMENTED METHODS AND SYSTEMS FOR AUTOMATED COACHING AND DISTRIBUTION OF FITNESS PLANS

(71) Applicant: Garrett James Blevins, San Diego, CA (US)

(72) Inventor: Garrett James Blevins, San Diego, CA (US)

(73) Assignee: Garrett Blevins, Escondido, CA (US)

( * ) Notice: Subject to any disclaimer, the term of this patent is extended or adjusted under 35 U.S.C. 154(b) by 1206 days.

(21) Appl. No.: 16/243,095

(22) Filed: Jan. 9, 2019

(65) Prior Publication Data

US 2019/0247718 A1    Aug. 15, 2019

Related U.S. Application Data

(60) Provisional application No. 62/628,960, filed on Feb. 10, 2018.

(51) Int. Cl.
| | |
|---|---|
| *A63B 24/00* | (2006.01) |
| *G06F 16/23* | (2019.01) |
| *G06N 5/02* | (2023.01) |
| *G06Q 10/10* | (2023.01) |
| *G09B 19/00* | (2006.01) |

(52) U.S. Cl.
CPC ...... *A63B 24/0075* (2013.01); *G06F 16/2379* (2019.01); *G06N 5/02* (2013.01); *G06Q 10/10* (2013.01); *G09B 19/0038* (2013.01); *G09B 19/0092* (2013.01)

(58) Field of Classification Search
CPC .................. A63B 24/0075; G09B 19/0092
See application file for complete search history.

(56) References Cited

U.S. PATENT DOCUMENTS

| | | |
|---|---|---|
| 7,376,700 B1 | 5/2008 | Clark et al. |
| 9,473,593 B2 | 10/2016 | Wallace et al. |
| (Continued) | | |

OTHER PUBLICATIONS

Client Information Questionnaire, ProgressFitnessSpa, 2011 pp. 1-8, https://progressfitnesspa.com/wp-content/uploads/Client%20Information%20Questionaire.pdf (Year: 2011).*

*Primary Examiner* — Omkar A Deodhar
(74) *Attorney, Agent, or Firm* — Shook, Hardy & Bacon L.L.P.

(57) ABSTRACT

Computer implemented methods and systems for automated coaching and distribution of fitness plans is disclosed. The method includes receiving, by a processor, a fitness related information from one or more clients in response to an initial questionnaire. The fitness related information includes at least meet details, a fitness goal, a fitness history, an exercise ability and a payment list. The method includes creating, by the processor, a plurality of arrays in an electronic document for each client of the one or more clients. The plurality of arrays is configured to store the fitness related information. The method includes processing, by the processor, the fitness related information automatically to generate a fitness plan for each client based on the plurality of arrays, and a set of predefined rules. The method further includes distributing, by the processor, the fitness plan automatically through a personal communication to each client.

20 Claims, 25 Drawing Sheets

(56) References Cited

U.S. PATENT DOCUMENTS

| | | |
|---|---|---|
| 2002/0069189 A1 | 6/2002 | Bertrand et al. |
| 2005/0228691 A1 | 10/2005 | Paparo |
| 2010/0003653 A1 | 1/2010 | Brown |
| 2016/0225284 A1 | 8/2016 | Schoen et al. |
| 2016/0263439 A1* | 9/2016 | Ackland ............... A61B 5/0205 |
| 2017/0368413 A1* | 12/2017 | Shavit ................. A61B 5/1123 |

* cited by examiner

3/9

QUESTIONNAIRE

MAXES AND COMPETITION SECTIONS

WHAT IS YOUR SQUAT MAX( WRITE ONLY THE NUMBER)?*

715

WHAT IS YOUR BENCH MAX( WRITE ONLY THE NUMBER)?*

495

WHAT IS YOUR DEADLIFT MAX( WRITE ONLY THE NUMBER)?*

730

WHAT IS YOUR COMP SQUAT STYLE?*
- ◉ LOW BAR
- ○ HIGH BAR

WHAT IS YOUR COMP BENCH GRIP?*
- ◉ WIDE
- ○ MEDIUM
- ○ NARROW

QUESTIONNAIRE

LIFTER HISTORY

HOW MANY TOTAL DAYS PER WEEK DO YOU SQUAT(LOW BAR OR HIGH BAR)AND / OR DO SQUATTING VARIATIONS(LIKE PAUSE SQUATS, FRONT SQUATS, LEG PRESS, ETC..)?*

- ○ 1 DAY PER WEEK
- ● 2 DAYS PER WEEK
- ○ 3 DAYS PER WEEK
- ○ 4 OR MORE DAYS PER WEEK

HOW MANY TOTAL DAYS PER WEEK DO YOU BENCH PRESS AND / OR DO BENCH VARIATIONS(LIKE BENCH WITH DIFFERENT GRIP WIDTHS, FLOOR PRESS, INCLINE PRESS, DB BENCH, ETC..)?*

- ○ 1 DAY PER WEEK
- ○ 2 DAYS PER WEEK
- ○ 3 DAYS PER WEEK
- ● 4 OR MORE DAYS PER WEEK

DO YOU HAVE A MEET PLANNED?*

- ○ YES
- ● NO

[ PREVIOUS ]  [ NEXT ]

ACCESSORIES

👤 ADMIN@EXAMPLE.COM

🏠 HOME > ACCESSORIES

SHOW [10] ENTRIES — 712 → SEARCH

| ID NUMBER 718 ↕ | FULL NAME 720 ↕ | ACTION 721 |
|---|---|---|
| 9 | KETTLEBELLS | ✏️ 👁 |
| 5 | FRONT | ✏️ 👁 |
| 4 | SSB | ✏️ 👁 |
| 3 | BAND/CHAIN | ✏️ 👁 |
| 1 | DB | ✏️ 👁 |

SHOWING 1 OF 5 OF 5 ENTRIES

[NEW ACCESSORY] 716

[PERVIOUS] [1] [NEXT]

714, 722, 723, 724, 710, 700

Sidebar:
- ADMIN ONLINE
- DASHBOARD — 604
- USERS — 606
- EXERCISES — 608
  - ACCESSORIES — 702
  - CATEGORIES — 704
  - EXERCISES — 706
  - DAILY EXERCISES — 708
- MANAGE ARRAYS — 610
- FATIGUE STYLES — 612
- RELATIVE INTENSITY MATRIX — 614
- STATIC PAGES — 616
- PAYMENT LOG — 618
- SUBSCRIPTION PLANS — 620

EXERCISES ~750

@ADMIN@EXAMPLE.COM

🏠 HOME > EXERCISES

| SELECT CATEGORY ▲▼ | NOT SELECTED | | | | 751 ~ SEARCH | |
|---|---|---|---|---|---|---|

SHOW [10 ▲▼] ENTRIES · · · SEARCH

| ID ↕ 753 | EXERCISE ID ↕ NUMBER 754 | EXERCISE NAME 755 ↕ | CATEGORY 756 ↕ | STYLE 757 ↕ | MISS POINT 758 ↕ | ACCESSORIES 759 ↕ | ACTION 760 ↕ |
|---|---|---|---|---|---|---|---|
| 24 ◀ 764 | SQ 22 | LOW BAR | SQUATS | LOW BAR | I DO NOT KNOW | | ✎ ◉ 🗎 |
| 23 | SQ 21 | SQ 21 | SQUATS | LOW BAR | IN THE HOLE | | ✎ ◉ 🗎 |
| 22 | SQ 20 | SQ 20 | SQUATS | LOW BAR | JUST ABOVE PARALLEL | | ✎ ◉ 🗎 |
| 20 | DL 3 | DL 3 | DEADLIFT | CONVENTIONAL | AT LOCKOUT | BAND/CHAIN | ✎ ◉ 🗎 |
| 19 | DL 2 | DL 2 | DEADLIFT | CONVENTIONAL | BELOW KNEES | BAND/CHAIN | ✎ ◉ 🗎 |
| 20 | DL 1 | DL 1 | DEADLIFT | CONVENTIONAL | CAN'T BREAK OFF FLOOR | DB | ✎ ◉ 🗎 |

747 ~   752 ~   745 ~

Sidebar (602):
- 604 DASHBOARD
- 606 USERS
- 608 EXERCISES ▼
  - 702 ACCESSORIES
  - 704 CATEGORIES
  - 706 EXERCISES
  - 708 DAILY EXERCISES
- 610 MANAGE ARRAYS
- 612 FATIGUE STYLES
- 614 RELATIVE INTENSITY MATRIX
- 616 STATIC PAGES
- 618 PAYMENT LOG
- 620 SUBSCRIPTION PLANS

ADMIN ONLINE

761 ~ (ACCESSORIES column)
762, 763 ~ (ACTION icons)

FIG. 7C

EXERCISE ARRAY

ADMIN ONLINE

- ≡ DASHBOARD — 604
- USERS — 606
- ≡ EXERCISES — 608
- MANAGE ARRAYS — 610
- FATIGUE STYLES — 612
- RELATIVE INTENSITY MATRIX — 614
- STATIC PAGES — 616
- PAYMENT LOG — 618
- SUBSCRIPTION PLANS — 620
- MANAGE TRAINERS — 622
- ANNOUNCEMENTS — 624
- SETTINGS — 626

ADMIN@EXAMPLE.COM

🏠 HOME > EXERCISE ARRAY — 804    SEARCH

SHOW [10 ▼] ENTRIES

| ID NUMBER 810 | FULL NAME 812 | BASELINE TYPE 814 | GOAL TYPE 816 | NO. OF WEEKS 818 | ACTION 820 |
|---|---|---|---|---|---|
| 28 | GBPL-SBDB ETYG | -30% OF BASELINE | POWER LIFTING | 8 | |
| 27 | GBPL-SBD12 MIN | -20% OF BASELINE | POWER LIFTING | 12 | |
| 26 | GBPL-SBD12 | 10% OF BASELINE | POWER LIFTING | 12 | |
| 25 | GBPL-SBD12PLU | +60% OF BASELINE | POWER LIFTING | 12 | |
| 24 | GBPL-SBD20 | 40% OF BASELINE | POWER LIFTING | 12 | |
| 23 | GBPL-SBD20 DE | BASELINE | POWER LIFTING | 12 | |

SHOWING 1 OF 4 OF 4 ENTRIES

NEW EXERCISE ARRAY — 808

PERVIOUS  1  NEXT

FIG. 8A

| | P | S | T | Q | SL | TL |
|---|---|---|---|---|---|---|
| 1 | 1 | | | 2 | 3 | 2 |
| 2 | 2 | 2 | | 2 | 3 | 3 |
| 3 | 3 | 3 | | 3 | 3 | 3 |
| 4 | 4 | 4 | | 3 | 3 | 3 |
| 5 | 5 | 5 | | 3 | 3 | 3 |
| 6 | 5 | 2 | | 3 | 3 | 3 |
| 7 | 5 | 2 | | 3 | 3 | 3 |
| 8 | 5 | 3 | | 3 | 3 | 3 |
| 9 | 5 | 4 | | 3 | 3 | 3 |
| 10 | 6 | 4 | | 3 | 3 | 3 |
| 11 | 6 | 4 | 2 | 3 | 3 | |
| 12 | 6 | 4 | 2 | 3 | 3 | |
| 13 | 6 | 4 | 3 | 3 | 3 | |
| 14 | 6 | 5 | 3 | 3 | 3 | |
| 15 | 6 | 5 | 4 | 3 | 3 | |
| 16 | 7 | 5 | 4 | 3 | 3 | |
| 17 | 7 | 6 | 4 | 3 | 3 | |
| 18 | 7 | 6 | 5 | 3 | 3 | |
| 19 | 8 | 6 | 5 | 3 | 3 | |
| 20 | 8 | 7 | 5 | 3 | 3 | |
| 21 | 8 | 7 | 6 | 3 | 3 | |
| 22 | 9 | 7 | 6 | 3 | 3 | |

COMPUTER IMPLEMENTED METHODS AND SYSTEMS FOR AUTOMATED COACHING AND DISTRIBUTION OF FITNESS PLANS

TECHNICAL FIELD

Embodiments of the disclosure relate generally to the field of fitness and online coaching or training. Embodiments relate more particularly to an automated coaching and distribution system that applies artificial intelligence to mimic a coach's system.

BACKGROUND

Most people recognize the worth of physical fitness and accordingly prefer a personal coach to discover different approaches to achieve their goals. Typically, a coach provides training and guidance to prepare a client to achieve a specific personal or professional goal. This process of personal training/coaching is based on the client's expressed interests, goals, and objectives.

A specific difficulty that exists in personal training is the amount of time required to create a customized fitness plan for each client. Most coaches spend a great amount of time to create a fitness plan based on the client's requirement and ongoing feedback during training. As a consequence, the coach is constrained to meet the needs of numerous clients at the same time and might eventually lose those clients who will approach other available coaches. Additionally, while creating fitness plans manually, coaches inevitably make errors that may at times go unnoticed and can only spend so much time working on each client's program. Alternatively, a coach may simply choose exercises from a list or have pre-made templates of exercises. In such a circumstance, customized coaching is compromised and cookie-cutter information is sent to the clients. Further, such pre-made templates do not allow changes in the fitness plan based on the client's workout progress.

It is clear there are certain disadvantages of the existing solutions for personal training such as the high price, limited review and adjustment time, as well as likely human errors, are a few to name. Further, the existing solutions are not scalable and restrict the number of clients a coach could possibly handle.

Considering the above discussion, there exists a need for an automated coaching method that addresses these and other shortcomings in the art.

SUMMARY

Various embodiments of the present disclosure provide computer implemented methods and systems for automated coaching and distribution of fitness plans to one or more clients.

In an embodiment, a computer-implemented method is disclosed. The method includes receiving, by a processor, a fitness related information from one or more clients in response to an initial questionnaire. The fitness related information includes at least a meet details, a fitness goal, a fitness history, an exercise ability and a payment list. The method includes creating, by the processor, a plurality of arrays in an electronic document for each client of the one or more clients. The plurality of arrays is configured to store the fitness related information. The method includes processing, by the processor, the fitness related information automatically to generate a fitness plan for each client of the one or more clients based on the plurality of arrays, and a set of predefined rules. The method further includes distributing, by the processor, the fitness plan automatically through a personal communication to each client of the one or more clients.

In another embodiment, a computing device is disclosed. The computing device includes a memory to store instructions and a processor to execute the stored instructions in the memory and thereby cause the computing device to perform the method. The method includes receiving, by the processor, a fitness related information from one or more clients in response to an initial questionnaire. The fitness related information includes at least a meet details, a fitness goal, a fitness history, an exercise ability and a payment list. The method includes creating, by the processor, a plurality of arrays in an electronic document for each client of the one or more clients. The plurality of arrays is configured to store the fitness related information. The method includes processing, by the processor, the fitness related information automatically to generate a fitness plan for each client of the one or more clients based on the plurality of arrays, and a set of predefined rules. The method further includes distributing, by the processor, the fitness plan automatically through a personal communication to each client of the one or more clients.

In yet another embodiment, a method is disclosed. The method includes receiving, by a processor, a fitness related information from one or more clients in response to an initial questionnaire. The fitness related information includes at least a meet details, a fitness goal, a fitness history, an exercise ability and a payment list. The method includes creating, by the processor, a plurality of arrays in an electronic document for each client of the one or more clients. The plurality of arrays is configured to store the fitness related information. The method includes processing, by the processor, the fitness related information automatically to generate a fitness plan for each client of the one or more clients based on the plurality of arrays and a set of predefined rules. The method further includes distributing, by the processor, the fitness plan automatically through a personal communication to each client of the one or more clients. The method also includes receiving a fatigue information of each client for the fitness plan after a predefined time. The method furthermore includes adjusting the fitness plan of each client automatically based on the fatigue information. The fatigue information is in the form of a questionnaire formulated by artificial intelligence.

BRIEF DESCRIPTION OF THE FIGURES

For a more complete understanding of example embodiments of the present technology, reference is now made to the following descriptions taken in connection with the accompanying drawings in which:

FIG. 4B shows an example representation of a UI displayed to a user on a user device depicting a questionnaire for receiving fitness information, in accordance with another example embodiment;

FIG. 4C shows an example representation of a UI displayed to a user on a user device depicting a questionnaire for receiving fitness information, in accordance with yet another example embodiment;

FIG. 6B shows an example representation of a UI displaying a list of clients managed by the administrator of the fitness platform, in accordance with an example embodiment;

FIG. 7A shows an example representation of a UI for managing accessories required by the user for performing exercises in the fitness plan, in accordance with an example embodiment;

FIG. 7B shows an example representation of a UI for managing categories of exercises assigned to the user in the fitness plan, in accordance with an example embodiment;

FIG. 7C shows an example representation of a UI for managing exercises assigned to the user in the fitness plan, in accordance with an example embodiment;

FIG. 8A shows an example representation of a UI for managing a plurality of arrays in an electronic document, in accordance with an example embodiment;

FIG. 12 is an example of a pattern of sets, in accordance with an example embodiment.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various example embodiments of the present disclosure provide computer implemented methods and systems for automated coaching and distribution of fitness plans for one or more clients.

The term "coach" as used herein refers to as an individual having knowledge of general fitness and who constantly engages participants to achieve their fitness goal. Moreover, the terms 'user' and 'client' have been used interchangeably throughout the present description.

Figure 1:
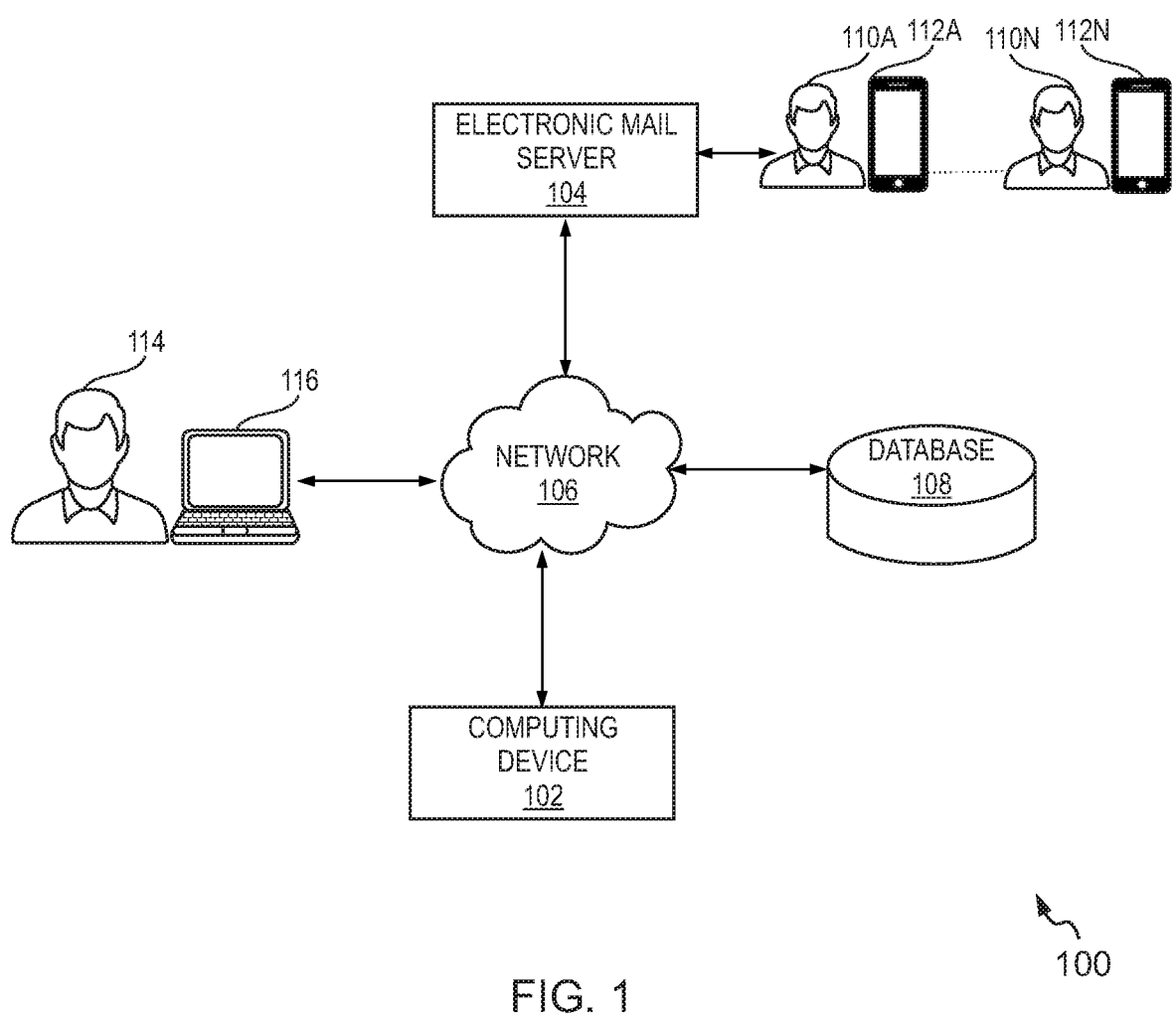
FIG. 1 is an illustration of an environment, where at least some example embodiments can be practiced.

FIG. 1 is a block diagram of an environment, according to the embodiments as disclosed herein. The environment 100 includes a computing device 102, an electronic mail server 104, a network 106, a database 108, a plurality of clients, for example client A (see, 110A) and client N (see, 110N), and an administrator 114.

The computing device 102 is a portable electronic or a desktop device configured with a user interface (not shown in FIG. 1) to interact with the user. Examples of the computing device 102 include, but are not limited to, a personal computer (PC), a mobile phone, a tablet device, a personal digital assistant (PDA), a smart phone and a laptop. Examples of the user interface include, but are not limited to, display screen, keyboard, mouse, light pen, appearance of a desktop, illuminated characters and help messages.

The computing device 102 is configured with a non-transitory computer-readable medium (workout algorithm), the contents of which cause it to perform the method disclosed herein. An exclusive feature of the workout algorithm includes combining every decision a coach/administrator could possibly take in creating a workout plan (initial plan from current time to a test or objective), how to adjust workout sessions as they are performed (real-time adjustments), how to adjust future plans after the completion of the plan (gather the results) and then programming those combinations of decisions. Consequently, this feature allows the fitness plan to adjust based on the client's requirement.

The electronic mail server 104 is typically a mail server employed to perform the method described herein. The mail server is typically a computing device (as described above) that sends and receives electronic mail (email). Further, the mail server communicates using standard email protocols for instance, Simple Mail Transfer Protocol (SMTP), Internet Message Access Protocol (IMAP) and Post Office Protocol 3 (POP3).

Further, the computing device 102 and the electronic mail server 104 are connected through the network 106. Examples of the network 106 include, but are not limited to, wireless network, wire line network, public network such as the Internet, Intranet, private network, General Packet Radio Network (GPRS), Local Area Network (LAN), Wide Area Network (WAN), Metropolitan Area Network (MAN), cellular network, Public Switched Telephone Network (PSTN), personal area network, and the like. For example, the network 106 can be operable with cellular networks, Bluetooth network, Wi-Fi networks, or any other networks or combination thereof.

The database 108 stores information of numerous clients in the form of questionnaires (a set of questions with choice of answers intended for a statistical study). This information is easily accessed and updated by the computing device 102. In most cases, each client will endure a plurality of workout cycles until his/her goal is achieved. The initial questionnaire outlines the fitness plan and is saved in the database 108. For subsequent workout cycles, the client sends in his/her training logs or this information could be uploaded to a virtual machine which is running the system processes. These training logs will be saved along with the initial questionnaire of the particular client.

The clients, for example, the client A 110A and the client N 110N are individuals who require coaching for their health and well-being. More specifically, these clients are individuals who seek coaching for activities including but not limited to, powerlifting, bodybuilding, CrossFit, Olympic lifting, strongman and sports performance. The environment 100 includes the administrator 114 having knowledge of general fitness and who constantly engages participants to achieve their fitness goal. More specifically, the administrator 114 is a coach who manages fitness plans of the clients (the client A 110A, and the client N 110N).

The clients 110A, 110N (also interchangeably referred to as 'users') and the administrator 114 may have one or more devices to communicate with other entities of the environment 100 via the network 106. For instance, the client 110A has one or more devices, for example a device 112A, and the client 110N has one or more devices, for example a device 112N, respectively. Similarly, the administrator 114 is associated with a device 116. Examples of the devices 110A, 110N, and 116 include, but are not limited to, desktops, laptops, smartphones, tablets, smart watches, and other such data processing devices with communication capability or such devices that can be accessed by any other devices having communication capability.

To begin, the client 110A, creates a paid subscription and then fills out an initial questionnaire. The initial questionnaire and subscription list are received by the computing device 102 through the network 106. All successfully paid subscriptions are placed into a batch. The batch is processed line by line to create a fitness plan for the client when housed in Excel but a virtual machine would process them in real-time without the need to batch. Simultaneously, the electronic mail server 104 attaches the fitness plan to an email and sends it to the client 110A when housed in Excel or displays the information immediately in the client's App depending on the system used. The client 110A can then download their fitness plan or view it on the App, perform the plan, enter in any day to day feedback and/or fill out subsequent questionnaires. Additionally, the client 110A can send back their training logs to the computing device 102 in an Excel based system or the virtual machine will assess adjustments in real-time for an App based system. The feedback may be a fatigue information of the client 110A or an injury information. Ongoing adjustments to the fitness plan are made based on the feedback through batching in Excel (VBA code) or by real-time assessment in a virtual machine according the coach's parameters; this can include in session adjustments (changes in the current workout), in week adjustments (changes to days later in the week), in cycle adjustments (changes to the current block), inter cycle adjustments (changes to the next cycle), or inter mesocycle adjustments (changes to the next overarching plan of multiple cycles). Alternatively, in the case of an injury to the client 110A, a rehabilitation plan may be worked out or the fitness plan may be adapted based on degree of injury as understood from an injury report including the injury information. The updated fitness plan is subsequently sent back to the client 110A automatically at a specified time (i.e. at the start of the next week, cycle, etc.) and/or real-time updates to the current session result. This process is repeated until the client 110A achieves his/her fitness goal and until payments are cancelled.

The fitness plan may be automatically generated by an automated fitness platform that may be hosted and managed by the computing device 102. The automated fitness platform presents a client interface for the clients 110A, 110N in the devices 112A, 112N and an administrator interface for the administrator 114. The client interface displays the fitness plan on a weekly/daily basis and also has provisions for the client to provide a feedback (fatigue information) based on the exhaustion experienced by the client while performing exercises in the fitness plan. The administrator interface enables the administrator 114 to manage the fitness plans of the clients (clients 110A, 110N) by monitoring, editing, modifying the progress and/or modifying the exercises in the fitness plan. The automated fitness platform may be an application resting at the computing device 102 in form of a web application or a mobile application. The mobile application may be available for download on Google® Playstore, Apple® app store, etc. The instances of the application can be made available at devices, such as the devices 112A, 112N, 116.

Figure 10:
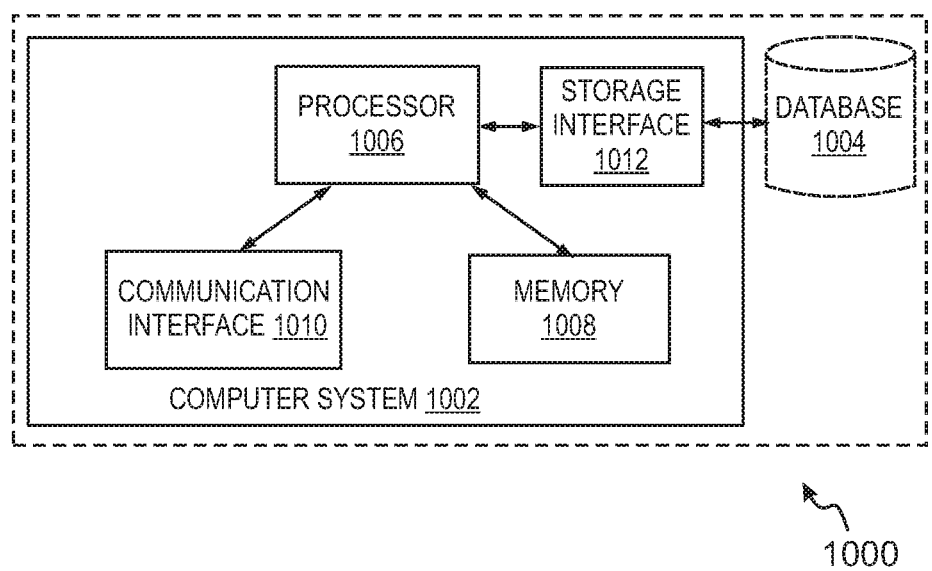
FIG. 10 is a block diagram of a computing device of FIG. 1, in accordance with an example embodiment.

It is noted that the instructions (or the executable code) configuring the automated fitness platform are stored in a memory of the computing device 102, and the instructions are executed by a processor (for example, a single-core or a multi-core processor) included within the computing device 102, as is exemplarily shown with reference to FIG. 10. However, once the automated fitness platform is installed on the device 116, via its processor, the automated fitness platform can manage the automatic generation of fitness plans for the one or more clients (clients 110A, 110N).

It should be appreciated by those of ordinary skill in the art that FIG. 1 depicts the computing device in an oversimplified manner and a practical embodiment may include additional components and suitably configured processing logic to support known or conventional operating features that are not described in detail herein.

Various embodiments of the computing device are explained with reference to FIGS. 2 to 12.

Figure 2:
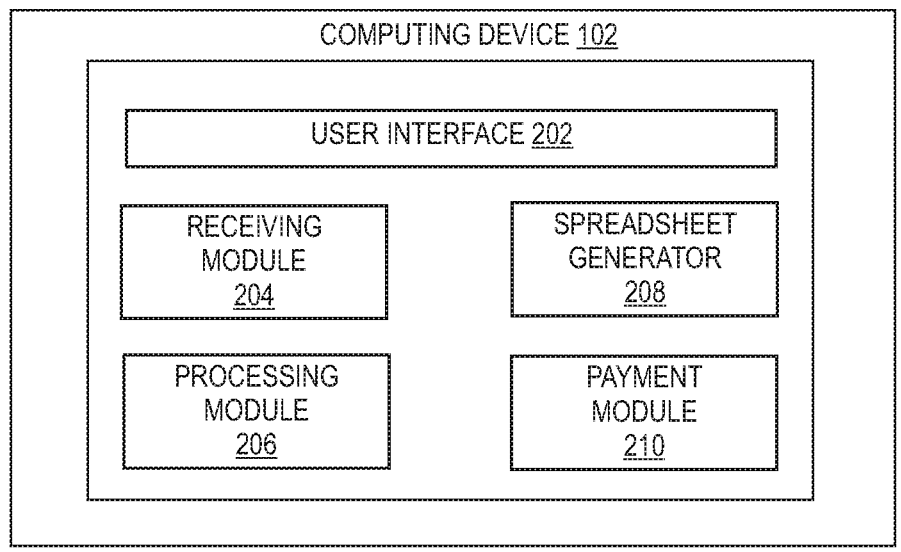
FIG. 2 is a block diagram of a computing device, in accordance with an example embodiment.

FIG. 2 is a block diagram of a computing device, according to the embodiments as disclosed herein. The computing device 102 includes a user interface 202, a receiving module 204, a processing module 206, a spreadsheet generator 208 and a payment module 210.

The user interface 202 interacts with a client (such as the client 110A) operating the computing device 102. Examples of the user interface 202 include, but are not limited to, display screen, keyboard, mouse, light pen, appearance of a desktop, illuminated characters and help messages.

The receiving module 204 is accountable to obtain questionnaires and feedbacks from the client. An initial questionnaire is received from the client and subsequently training logs (again in the form of questionnaires) are received for a plurality of training cycles. Further, the questionnaires are handled through Google® Questionnaires or any other suitable survey services may be implemented. Typically, the questionnaires populate a response list in Google® sheets.

The processing module 206 is in charge of processing instructions for execution within the computing device 102, including instructions stored in a memory (not shown in FIG. 2) or on the network 106 to display information through the user interface 202. The processing module 206 is also programmed with artificial intelligence (AI) in a suitable specialized programming language. Specifically, the artificial intelligence was first implemented with "If-Then" logic in Visual Basic for Applications (VBA) that would be based on expected answers as collected from multiple choice questions and subjective feedback. Further, the artificial intelligence mimics the coach's mind and decision-making process as data is pushed through a coach's logic and alterations are made to the upcoming plan. This process can also be created in "If-Then" logic of any coding language and can be run through a virtual machine and displayed in an App.

Artificial intelligence is a branch of computer science that makes computers to operate in ways believed to mimic human thought processes, such as reasoning and learning. Artificial intelligence allows computers to learn from experience, adjust to new inputs and perform human-like tasks. This system replicates an Expert's decisions, but the adjustments and new logical decisions will be manually created as the coach observes the system, client results, and refines in their desired training style.

Further, when the artificial intelligence receives the client's feedback it will adjust the next month's training for the client. "IF-THEN" statements are used and would possibly work as below:

In the questionnaire, a client may be asked "How many days a week did you feel fresh and excited to be going to the gym?". "IF" the answer was "every day" "THEN" the system would prescribe more volume or intensity or even both. However, "IF" the answer was "I felt fresh only once in the last month" "THEN" the volume or intensity or both could be decreased in the next training cycle. thereby allowing the client to recover. The exact prescriptions and interventions will be linked to how the expert coaches actually adjust training.

The spreadsheet generator 208 is the core component of the system described herein. A spreadsheet is developed to organize, analyze and store data in a tabular form. Here, data are entered in cells of a table. Each cell may comprise of numeric data, text data or results of formula that automatically calculate and display a value based on the contents of other cells. An exemplary spreadsheet generator 208 used for the purpose of the present disclosure is Microsoft Excel. However, any other suitable spreadsheet generator may also be used to perform the method disclosed herein or it could be stored as prescribed in an App based system.

Further, the spreadsheet generator 208 is programmed with an algorithm composed of numerous "IF-THEN" formulas, arrays, exercise progressions and training plans. Typically, the algorithm is created with a "coach's mind" and is applied within seconds to the plurality of clients. The algorithm is capable of accommodating every possible situation of a training period and the creation of additional periods based on results.

The payment module 210 handles all payments made by the clients. For instance, the payment process might be handled by Stripe or PayPal®. The spreadsheet generator 208 searches for current payments and then corresponding questionnaires are checked to identify paid clients.

More specifically, the spreadsheet generator 208 integrates with the electronic server 104 to automatically attach a fitness plan to a personal mail and sends them to the specific client. This could also be done through the sending of the next day or week of workouts through and App. The integration of multiple Microsoft® Office Platforms, Google® Forms and PayPal® articulates a unique feature of the system described herein when considering the Excel based version while a virtual machine programmed with the algorithm is another possible iteration of the creation and distribution of the product.

Figure 3A:
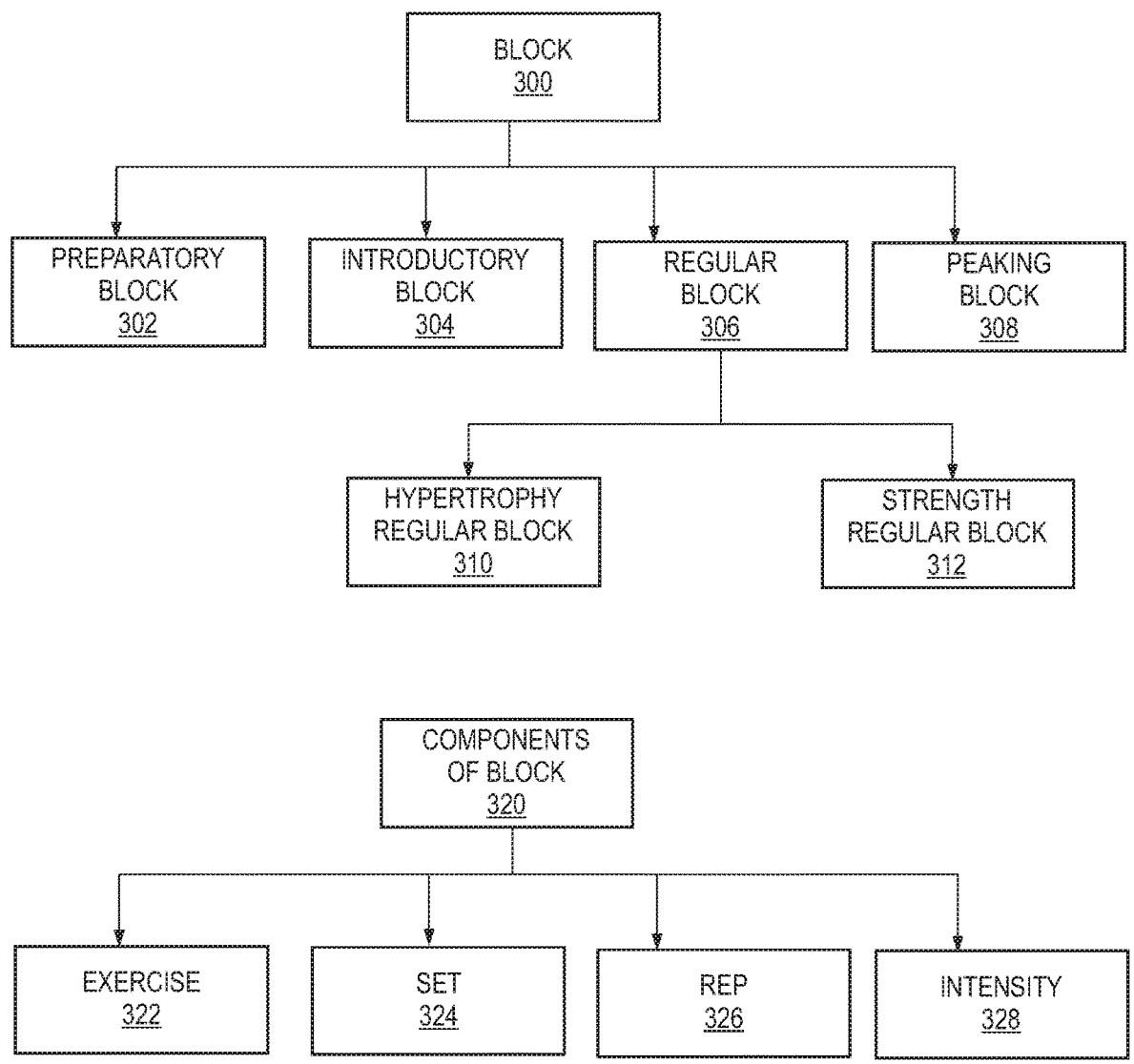
FIG. 3A is a schematic representation of types of blocks used in a macro cycle/training period and components of each block, in accordance with an example embodiment.

FIG. 3A is a schematic representation of types of blocks used in a macro cycle/training period and components of each block, in accordance with an example embodiment. The blocks 300 can be any of a preparatory block 302, an introductory week 304, a regular block 306 and a peaking block 308. The preparatory block 302 may last for less than a week and workouts in the preparatory week 302 act as a placeholder before introductory blocks 304. For example, clients may sign up for a meet on a Thursday/Sunday. The client may have to wait 6 days before starting and this would imply skipping part of the first week of the progression (missing their day 1) so the solution is to begin the fitness plan with the preparatory block 302 that does not directly impact the following block (i.e. the introductory block 304).

The introductory block 304 (also referred to as transition weeks) is usually 1-2 weeks in length. The introductory block 304 is usually a simplified/lighter version of whatever is week 1 of the first regular block. For example, if a client is 4 weeks away from meet then they could use just one from 4 weeks regular block, same with a 5 weeks example. But if they were 6 or 7 weeks for a meet, then a 5 week regular block with 1 or 2 introduction weeks (introduction blocks) would be needed.

The regular block 306 may be a 4 week training block or a 5 week training block focused on a specific goal. The regular block 306 may be a hypertrophy regular block 310 or a strength regular block 312. The hypertrophy regular block 310 is a regular block of higher volume, high reps, and less specific exercises focused on growing muscles whereas the strength regular block 312 is a block of medium to low volume, medium reps, and specific exercises focused on training your body for the competition lifts.

The peaking block 308 is a 4 or 5 weeks training block at the end of a cycle that peaks the client for a meet/test. The peaking block 308 will have the lowest volume, lowest reps (usually 3 or less per set of the main lifts) with the highest intensity. Further, the peaking block 308 ends in a 1-2 week taper that will allow the client to recover more than usual right before a competition while still holding the adaptations made in the macro cycle/training period.

An example ordering of the blocks would be:
Preparatory (<week)->Introduction (1-2 weeks)->Regular Blocks (one or more 4 or 5 weeks blocks)->Peak (4-5 weeks)

Again, the order of training decisions is as follows
1. Calculate the total number of training weeks (training period) based on a start date of the fitness plan and a meet date.
2. Subtract the number of weeks of the peaking block to get the remaining weeks.
3. Attempt to take 2 introductory weeks from the remaining weeks and see if the amount of weeks left can be broken into 4 and/or 5 week block combinations.
   a. If it cannot, try taking only 1 introductory week from step 2 and see if it can be broken into 4 and/or 5 week block combinations.
   b. If it cannot, then try having no introductory weeks.
   c. If not, then change the peak amount from 5 to 4 or 4 to 5 and start at step 3.

Predefined Rules
Periodization Stitcher Rules
It shall be noted that the rules are listed in order of priority as follows:
1. Determine if the athlete should peak using a 4 or 5 week block at the end of the cycle.
2. Include 2 introduction weeks at the beginning of each plan and after a test.
3. Only use 5 week blocks (other than the peaking block) if necessary.
4. Place 5 week blocks first in the macro cycle/training period and 4 weeks after.

Rules for Introductory Blocks
It shall be noted that the rules are listed in order of priority as follows:
1. It will have the same exercises as the first regular block's week 1
2. Each introduction week will have 2 less reps per set than the one before it if the block leading to a hypertrophy block and 1 less rep if it is leading to a strength or peaking block. Therefore, if there are two introduction weeks before a hypertrophy regular block then the first introduction week would have 4 less reps per set than the first week of the regular block, and the second introduction week would have 2 less reps per set than the first week of the regular block (i.e. 2 more reps per set than the first introduction week). This would mean if the first regular block had 10 reps in a set then the first introduction week would have 6 reps and the second introduction week would have 8 reps. If the block was a strength block with 6 reps, then the first introduction week would have 4 reps and the second introduction week would have 5 reps.
3. Similarly, just as the reps drop by 2 or 1 each week, if the exercise is percentage based then the percentage should drop 2.5% for each week away from the regular block. Introduction week one should have 5% less than that of the regular block and introduction week two should have 2.5% less than that of the regular block.
4. If there is only one introduction week then on the first drop in reps and percentage is used (i.e. 2 or 1 reps less for hypertrophy and strength respectively and 2.5%).
5. If the exercises are RPE based then the RPE should decrease by 0.5 in the same manner as the percentage drops up to RPE 6 in which case it should go no lower.

Rules for Regular Blocks
It shall be noted that the rules are listed in order of priority as follows:
1. The last regular block of any training cycle needs to be a strength block. That means, if there is a regular block before a peaking block it is always a strength block.
2. No more than 4 of either type (hypertrophy or strength) will be done in sequential order. This means that no more than 4 hypertrophy blocks or 4 strength blocks will be done in any one training cycle (i.e. no more than 20 weeks [4 blocks of 5 weeks]).
3. Blocks of the same type will be grouped together (i.e. it would be hyp1->hyp2->hyp3->hyp4->str1->str2->pk and not hyp1->hyp2->str1->hyp3->hyp4->str2->pk)
4. If blocks of 5 weeks must be used to make the program length requirements then the priority style will be given the 5 week block and the 5 week options will be placed in the first and second blocks of that style as needed, no more than 2 blocks of each style may be 5 weeks long per macro cycle.
5. Hypertrophy blocks are placed as early as possible within the system set above, a block for an athlete with strength in priority will only have hypertrophy blocks if they have more than 4 regular blocks in their macro cycle.

For example, let's consider two athletes, H and S, who are both 19 weeks from a competition and who are given short peaks (i.e. 4 weeks). Both have competitions on Saturday of their meet week and sign up on Monday so they do not need a preparatory phase. However, athlete H is given hypertrophy as priority since he/she wants to gain weight and athlete S is given strength as priority since he/she wants to maintain weight.

Athlete H
Introduction (2 weeks)->Hyp1 (5 weeks)->Hyp2 (4 weeks)->Str1 (4 weeks)->Pk (4 weeks)=19 weeks
Athlete S
Introduction (2 weeks)->Str1 (5 weeks)->Str2 (4 weeks)->Str3 (4 weeks)->Pk (4 weeks)=19 weeks The first regular block for both is 5 weeks because of rule 4. Athlete H has a strength block before the peak due to rule 1. There are less than 5 blocks of regular training so the rule 2 does not apply. All hyp and str blocks are sequential, they are not alternated due to rule 3. Now let's take Athlete S and assume he/she has a meet after 34 weeks. That would mean he/she has 28 regular weeks after taking out the 4 weeks for the peak and the 2 weeks for transition. The 28 would be created by two 4 week blocks and four 5 week blocks as follows:
Int (2 weeks)->hyp1 (5 weeks)->hyp2 (5 weeks)->str1 (5 weeks)->str2 (5 weeks)->str (4 weeks)->str4 (4 weeks)->pk (4 weeks)

This is the maximum number of weeks that could be done with only 6 blocks of regular training because according to rule 4 only two blocks of each type can be 5 week blocks. Therefore, if the Athlete S was 35 weeks away then the plan would have to include an additional block as follows:

Int (2 weeks)->hyp1 (4 weeks)->hyp2 (4 weeks)->hyp3 (4 weeks)->str1 (5 weeks)->str2 (4 weeks)->str (4 weeks)->str4 (4 weeks)->pk (4 weeks)

The first strength block is still 5 weeks, this is because of rule 4 which states that the priority style (strength is this case) is assigned block for 5 first. Now, let's put Athlete H though the same 35 week option. It would look as follows.

Int (2 weeks)->hyp1 (5 weeks)->hyp2 (4 weeks)->hyp3 (4 weeks)->hyp4 (4 weeks)->str1 (4 weeks)->str2 (4 weeks)->str3 (4 weeks)->pk (4 weeks)

Notice that there are now four hypertropy blocks, this is because hypertrophy is given priority and four sequential blocks performed before moving to strength blocks. Also, the hyp1 block is not 5 weeks since it is the first block in that priority.

Each block 320 has a particular goal and the block will build on one another as client move towards the meet. These goals are accomplished through the manipulation of a set of variables—exercises 322, sets 324, reps 326, and Intensity 328. The set of variables (hereinafter referred to as 'ESRI') are the components of each block 320 and are manipulated to achieve the desired result of the block. All of the arrays discussed below are simply for the purpose of determining what variables should be chosen for these four areas.

Exercises

Exercises 322 are the broadest and most important category of the ESRI array. As of now, the exercises 322 are chosen based on three factors. These factors, in order of importance and decision making are as follows:

Weakpoints and/or muscular imbalances
Volume Tolerance
Equipment Availability

First, Weakpoints refer to the point in a lift where a lifter is weakest. This is determined by the client through knowledge of his or her training history and is gathered in the initial questionnaire. In essence, a weakpoint is the point in the lift where bar velocity reaches its lowest point or where the client misses the lift. For example, in the squat, possible weakpoints would be below parallel or above parallel. Within these two options, a coach may look at muscular imbalances and make additional decisions. For example, in this iteration we use the max squat and deadlift, parse it through an equivalency array, and determine if the client is balanced, has weak legs, or has a weak back. These three strength proportions will be combined with the weakpoint (above parallel or below parallel) and an exercise intervention will be chosen. For example, if a client misses the weight above parallel and has weak legs, then in the hypertrophy blocks, the client might have more leg work than back work to grow the quads and, in the strength block, the client might have more front squats or high bar squats to help build the quads. Conversely, if the client had a weak back, then the client would do more direct back work in the hypertrophy block and more back dominant hinge movements (Good mornings) in the strength block.

Second, not all clients have the same volume tolerance, therefore some may be able to overload with more taxing multi-joint movements than others. Some clients may be able to do barbell back squats 3× per week while others can only recover from 2× or 1×. As a result, less taxing exercises will be prescribed for less volume tolerant clients, such as pistol squats, goblet squats, etc., that are far less taxing to the body. The frequency of overloading exercises will be determined by MRV (maximal recoverable volume) calculations (see below).

Third, each coach will have exercises they prefer clients to do in various phases as their "optimal plan". Sometimes, these will be exercises everyone can do and sometimes, these will be exercises that can only be performed using some specialty equipment which only some clients will have. As a result, back up plans need to be available for the clients who do not have access to a specific piece of equipment. For example, if a coach thinks that safety squat bar work is the best way to help grow quads in a particular block for a weak leg client but that client does not have equipment for performing the safety squat bar work, then the program needs to be able to select the next best exercises for the client. As mentioned in the above example, assuming front squats is probably the closest alternative. However, some athletes may not be able to perform the safety squat bar work exercise due to physical limitations and, if that is the case, then a final swap to a general exercise needs to be made (such as to high bar). Each of these exercises will need to have a distinct intensity allocation, and at times reps might also change.

Sets

Sets are determined by MRV (maximum recoverable volume). MRV is a theoretical concept whereby the amount of work a person can recover from is calculated according to their biological and historical factors (i.e. age, weight, experience, past volume use, etc). This program has a maximum and minimum theoretical value for all people and each individual will fall into a percentile on that scale. Each percentile correlates to a total number of sets per week for each exercise type. There are certain breakpoints for each exercise that will signal the system to remove or add an overloading movement in the place of a less taxing movement. For example, let's suppose there is an Athlete who has a MRV that correlates to 8 total squat sets a week. This athlete would then be given two squatting exercises of the overloading category and then a less taxing exercises with 2-3 sets. The overloading days would be distributed in an uneven amount of 5 and 3 to total 8. In actuality, there are 10-11 sets being done but 2-3 may come from the non-overloading option. However, if in the course of training, the Athlete's MRV increases (as determined by reporting low fatigue) and it increases to 9, then in the next distinct block, a third overloading exercise would be added (replacing the non-overloading exercise). This would change the sets distribution to 5, 3, and 2. This is actually a total of 10 sets but one of the rules to adding sets is that one always adds at least 2 sets. If the Athlete's MRV rose to 10 sets, then the sets would stay the same but if it continues to rise to 11, then the sets would become 5, 3, 3 for the three overloading exercises.

Rules for sets
1. There will always be one overloading movement for squat, two for bench, and one for deadlift, no matter how low the MRV percentile is.
2. Sets will never decrease for overloading movements as additional overloading movements are added, meaning if overloading movement 1 is at 5 and overloading movement 2 is added, then the overloading movement 1 stays at 5.
3. If an MRV breakpoint is reached and an overloading movement is added, a client will be given 2 sets even if that increases the total number of sets to one more than the MRV.
4. Overloading movements are added or subtracted at the beginning of each new block, not in the middle. This means if the client is in hyp1 and his/her MRV increases based on feedback to the system, the client will not see a frequency change in overloading movements until hyp2.

5. The first breakpoint for overloading movements is 6, meaning once the client goes from 5 to 6, they would move from one overloading movement with 5 sets per week to two overloading movements, one with 5 and one with 2 (see rule 2 for why it starts at 2 and not 1 for the second overloading movement). The second breakpoint is at 11 as two tertiary overloading sets are added.
6. In an example, a pattern shown in FIG. 12 will be used to increase sets. The numbers in row 1 refer to MRV and P (Primary overloading), S (Secondary overloading), SL (Secondary non-overloading), T (Tertiary overloading), TL (Tertiary non-overloading), Q (quaternary overloading, if quaternary is used then it is always overloading—this usually only occurs with bench and not squat and deadlift).
7. Overloading movements will always have a primary (the first overloading movement what was used), secondary, tertiary, and possible quaternary movement option. The secondary overloading movement, when added, will start at 2 for the first 2 weeks. It will then grow in value each MRV until the MRV is one set less that the primary overloading movement. When the primary is at 6 and the secondary at 4 then the tertiary is added at 2 for 2 weeks (in yellow above), and follows the same rule of being one less except in reference to the secondary lift instead of the primary. Therefore, the primary is always at least one more than the secondary and the secondary is always one more than the tertiary. This process of adding one set to the primary, then next MRV to the secondary, the next MRV to tertiary, and then repeating should be repeated as long as needed to accommodate the MRV increase after MRV 15 where all three lifts overloading lifts are one set apart (orange above).

It should be noted that this chart may be slightly different for squat, bench and deadlift and each of the three lifts could have different MRVs. Additionally, the same MRV number (1-22) could refer to different numbers of sets in hypertrophy, strength and peaking, as a result, blocks of those styles should have a bump up or down depending on the block type. This means that in a hypertrophy block a client who is actually a 12 MRV is bumped up 4 MRV to 16 for the sets and when they are in a strength they are bumped up 2 to 14 and for peaking they are an actual 12. This is because the volume they are using in the hypertrophy and strength blocks come from different sources and thus will need to be increased to accommodate for the lighter absolute loads lifted as compared to the peaking block.

Reps

Reps are the most simple and straightforward of the variables. They change based on only two factors: block type and exercise type. Block type (hypertrophy or strength) determine the reps used. It is widely understood that volume is an important factor in muscle growth and it is easier to increase total volume by doing more reps per set. As a result, hypertrophy blocks will have overloading movements in the 8-10 reps range and non-overloading movements in the 12-20 reps range. Strength blocks will use lower rep ranges that help acclimate clients to heavier loads, overloading movements will be done in the 3-6 reps range and non-overloading in the 10-15 rep range. Peaking blocks will be done in a variety of ways but often use 1-3 reps per set and either remove non-overloading movements or use them in the 8-12 reps range.

Based on the type of block being used (as determined in the periodization stitching process) reps will be predetermined for each exercise type that can be chosen for the overloading and non-overloading movements. Usually there will be a single amount of reps listed for overloading exercises (e.g., 3×8 or 4×6) but it is possible that some overloading movements would use different amounts of reps in the same block. For example, a client might do 3×10 on squats on day 1 but on day 3 do 2×8 for squats. For non-overloading may have a range listed (e.g., such as 3×12-15 or 4×15-20). This is because the loading of these movements is lighter and as a result the client may need to increase the reps done per set before being able to increase the weight and giving a range to work with is more helpful.

Intensity

The intensity of the exercise is represented either as (1) a percentage and (2) a RPE. A percentage is a superior method for training in most cases and is easier for clients to determine. However, percentages have to be based on one rep max (hereafter referred to as '1RM') for a lift and this creates a limitation. A 1RM is the most amount of weight an athlete (a client) can do for a single repetition. More specifically, 1RM is the most they can lift. For power lifters, rep max will know only the maxes of the competition lifts: the squat, bench, and dead lift. More specifically, they will know their rep max for their competition squat, competition bench, and competition dead lift. For example, depending on where a lifter holds the bar on their back, they may have a high bar or low bar style squat. The high bar has the bar on the traps and the low bar has the bar on the rear delt. Similarly, some competitors are stronger with a closer bench grip or a wider and will use those different grip widths at different times. The same is true for conventional (hands outside the legs) and sumo (hands inside the legs) deadlifts. The max of the competition can be substantially different from the alternative forms of the same lift. For example, a lifter's (a client's) 1RM on the high bar squats might be 10% lower than their 1RM on the low bar squats. The amount of difference varies from one client to another client and is obtained via the initial questionnaire.

The percentage listed is of a 1RM and this is multiplied with the max to generate a weight amount. For example, if a client has to do 3×10 on squats with 60%, the weight used would be the client 1RM for squats×60%. Therefore, if the client max was 200, the client would use a training weight (load) of 120 lbs (200*60%) for the 3 sets of 10 reps.

Although, percentages are most often the desired method of determining training weights (loads), the load cannot be selected in an exact way for competition exercises. For example, if a low bar competition lifter had weak legs and high bar is given to them in a hypertrophy block to develop the quads even though both are barbell back squats, the percentages that would be used for low bar will likely be too high for the high bar variation. The problem with this method is that the coach will not know by how much.

Accordingly, a subjective scale of difficulty is used instead of a percentage to determine the loads for variations which do not have a known 1RM. This scale is known as a "Rate of Perceived Exertion" scale (hereafter RPE). RPE is a scale of 1-10 (although only 6-10 are used) which is understood as follows.

RPE 10—No more reps could have been done with the weight for that set.

RPE 9—1 more rep could have been performed with the weight for that set.

RPE 8—2 more reps could have been performed with the weight for that set.

RPE 7—3 more reps could have been performed with the weight for that set.

RPE 6—4 more reps could have been performed with the weight for that set.

In an example, if a client does a set of 10 with a weight and at the end of the set feels he/she could have done 2 more reps but not 3, then that weight is a RPE 8 set.

Figure 3B:
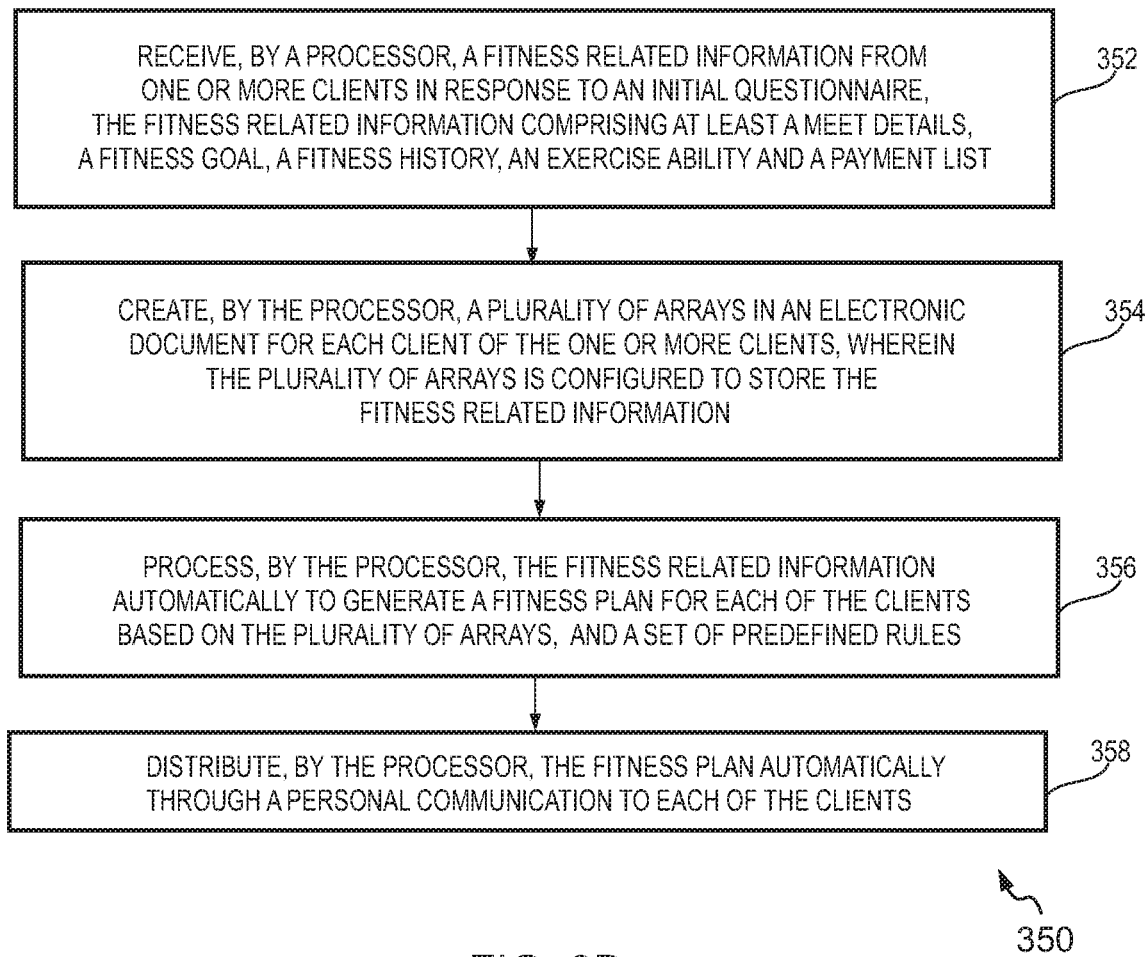
FIG. 3B is a flow diagram illustrating a method to automatically provide coaching and distribution of fitness plans for one or more clients, in accordance with an example embodiment.

FIG. 3B is a flow diagram of an example method 350 for automatically providing coaching and distribution of fitness plans to one or more clients, in accordance with an example embodiment. The operations of the method 350 may be performed by the computing device 102/200 or a fitness management platform residing at the computing device 102. The sequence of operations of the method 350 need not be necessarily executed in the same order as they are presented. Further, one or more operations may be grouped together and performed in form of a single step, or one operation may have several sub-steps that may be performed in parallel or in sequential manner.

At operation 352, the method 350 includes receiving, by a processor, a fitness related information from one or more clients in response to an initial questionnaire. The fitness related information includes at least a meet details, a fitness goal, a fitness history, an exercise ability and a payment list. The client may receive the initial questionnaire in response to a client request placed with the automated fitness platform. The questionnaire includes several sections that progresses into specific goals of the one or more clients. Specifically, the initial questionnaire includes general questions with choices for answers. For instance, "What are your goals?" may have options such as "Weight loss" or "Prepare for a powerlifting competition". As sections proceed, questions will be more specific to the client's goal. For example, the initial questionnaire includes one or more sections and subsequent sections include questions based on client response to questions in a previous section. Additionally, any area a coach may use as a data point for the creation of training plans would be included, including but not limited to biological factors (height, age, weight), weaknesses (where lifts are missed), current experience level/training age, access to equipment, and historical recovery and workload. As sections proceed, questions will be more specific to the client's goal as founded upon the particular coaching system they select. Examples of the questionnaire have been shown and explained with reference to FIGS. 4A-4D.

At operation 354, the method 350 includes creating, by the processor, a plurality of arrays in an electronic document for each client of the one or more clients. The plurality of arrays is configured to store the fitness related information. The responses of the client are arranged in corresponding fields in the electronic document. The payment lists and questionnaires are then imported into the spreadsheet generator, for instance Excel or into a virtual machine. Successfully paid subscriptions are then placed into a batch or processed. Decision-making process and plans are recreated through the use of the arrays or through an algorithm defined by the automated fitness platform that mimics the coach's logic.

At operation 356, the method 350 includes processing, by the processor, the fitness related information automatically to generate a fitness plan for each of the clients based on the plurality of arrays, the one or more existing arrays and a set of predefined rules. For instance, a predefined formula is defined for each array of the plurality of arrays for processing the fitness information and determining the set of variables (ESRI) based on the set of predefined rules. The predefined rules and decision making process for selecting the set of variables in the fitness plan for each client is explained with reference to FIG. 3A.

At operation 358, the method 350 includes distributing, by the processor, the fitness plan automatically through a personal communication to each of the clients. As the fitness plan of a client is determined, the fitness plan is shared with the client via a text message, email and/or displayed as a schedule in the client interface of the automated fitness platform.

Additionally, the body of the emails/notifications on the client interface are tailored to match the questionnaire answers so that each client receives specific instructions. Further, the fitness plan includes additional questions related to training, nutrition, cardio and subjective recovery. These are filled out each day or week to create real-time adjustments. These scores could be assessed over any period to further alter training decisions made by the system. For example, if a client consistently reports of being fatigued, then the baseline amount of work could be lowered from the original plan. The clients can then open their individual fitness plans (by downloading or accessing them through an app), perform the fitness plans and subsequently fill out more questionnaires and provide feedback on fatigue (fatigue information) accompanying their training logs. This process mimics the process of a coach gathering information from a client, creating a plan, and then adjusting that plan based on the actual experience of the client.

Typically, the client is subjected to a macro cycle that indicates a period of training. The training period is made of multiple training cycles (blocks) and is decided by the system described herein. Coaches have a variety of ways of viewing cycles or blocks, but a hallmark of training is a plan which will have distinct phases or progressions that build on one another.

An exemplary and preferred process of the method disclosed herein is implemented with Microsoft Excel. A macro in Microsoft Excel is initiated that runs line by line through the client's information stored in a batch. The macro that runs the batch also integrates with Outlook email and automatically attaches each fitness plan to an email and sends them to the respective clients. The clients can then download the fitness plan and begin their training sessions. Microsoft Excel then looks for current payments and identifies those specific clients who send in subsequent feedbacks. The fitness plan is then adjusted based on the feedbacks and is resent to the client. The process repeats until all payments are cancelled indicating that the client has met his/her goal. It should be appreciated by those of ordinary skill in the art that the method 350 can also be implemented with any other suitable spreadsheet generator as explained above.

Referring now to FIGS. 4A-4D, example representation of UIs 400, 420, 450, 480 displayed to a user on a user device depicting an initial questionnaire for receiving fitness information is illustrated in accordance with an example embodiment. The initial questionnaire depicted in the UIs 400, 420, 450, 480 may be multiple choice questions or a text box may be provided for the user to provide a response.

The UI 400 includes general questions for a client. For example, "Are you a new client?", "Do you use LBS/Kg for measurement?", "How many days a week do you want to train?", "What is your goal?" with multiple options. The user can select an option based on his/her decision. Further, the initial questionnaire includes several sections (shown in UIs 420, 450, 480) that progresses into specific goals of the one or more clients. As sections proceed, questions will be more specific to the client's goal. It shall be noted that the questions in the UI 400 are shown for example purposes only and the initial questionnaire may include fewer or more questions that may be general or specific to the client.

The UI 420 is displayed to the client when he/she submits responses for the questions in the general section (depicted by UI 400). The UI 420 depicts a maxes and competition section and may be specific based on the goal selected by the user in the general section (depicted by UI 400). It shall be noted that questions to a client are more specific as the client progressively moves from one section to another so as to collect fitness information of the client. Accordingly, the fitness plan is generated based on the fitness information. More specifically, the responses of the client to questions are analysed for preparing the fitness plan of the client.

As shown in FIG. 4B, the maxes and competition section include questions to analyse physical capability of the client. More specifically, an upper bound/maximum capability of the client for various exercises is acquired as fitness information from the client's response to the initial questionnaire. Some examples of questions in the maxes and competition form may be but not limited to "What is your squat max?", "What is your bench max?", "What is your deadlift max?", "What is your comp squat style?", "What is your comp bench grip?", "Do you know where you miss maximal attempts during a squat, bench and/or bench lift?" and the like. The questions may include multiple choice questions such as, choosing from a drop down menu and/or have provisions for providing responses in a text box. In another example, a question may have a reference chart and the client may have to lookup in the reference chart to provide a response for the question.

Figure 4A:
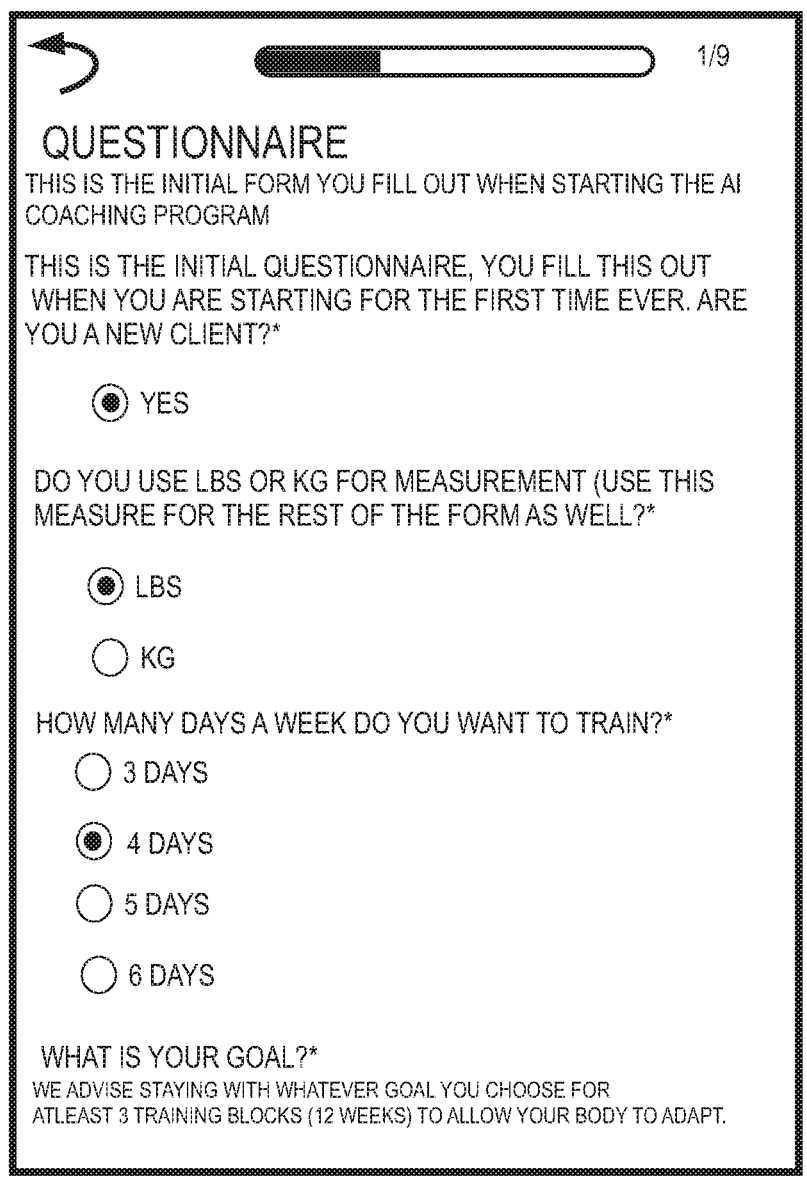
FIG. 4A shows an example representation of a UI displayed to a user on a user device depicting a questionnaire for receiving fitness information, in accordance with an example embodiment.
Figure 4D:
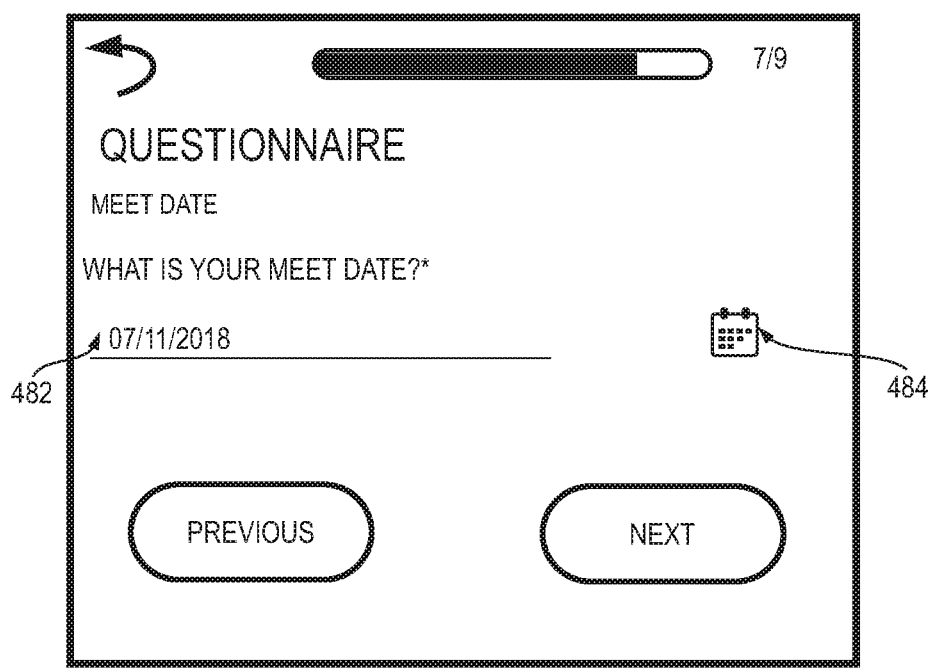
FIG. 4D shows an example representation of a UI displayed to a user on a user device depicting a questionnaire for receiving fitness information, in accordance with still another example embodiment.

The UI 450 is displayed to the client when he submits his/her responses to the maxes and competition section (UI 420). As shown in FIG. 4C, the UI 450 displays one or more questions for the client to acquire historical data associated with the client as lifter history section. More specifically, a workout schedule of the client or daily exercises schedule of the client is obtained using the lifter history section. The lifter history section may include questions such as, "How many days/week do you squat?", "Do you squat variations?", "Do you do high bar/low bar in squats?", "How many days per week do you do bench press?", "How many variations do you do in bench press?" and the like. The UI 480 is displayed to the client upon submitting responses to the lifter history section. As shown in FIG. 4D, the UI 480 displays a question requesting the client to provide meet date in a text box 482. The text box 482 may include a calendar tab 484 which the client may use to select the meet date. It shall be noted that the questions shown in the UI 450 are shown for example purposes only and the initial questionnaire may include fewer or more sections/questions than those depicted and described here.

Figure 5A:
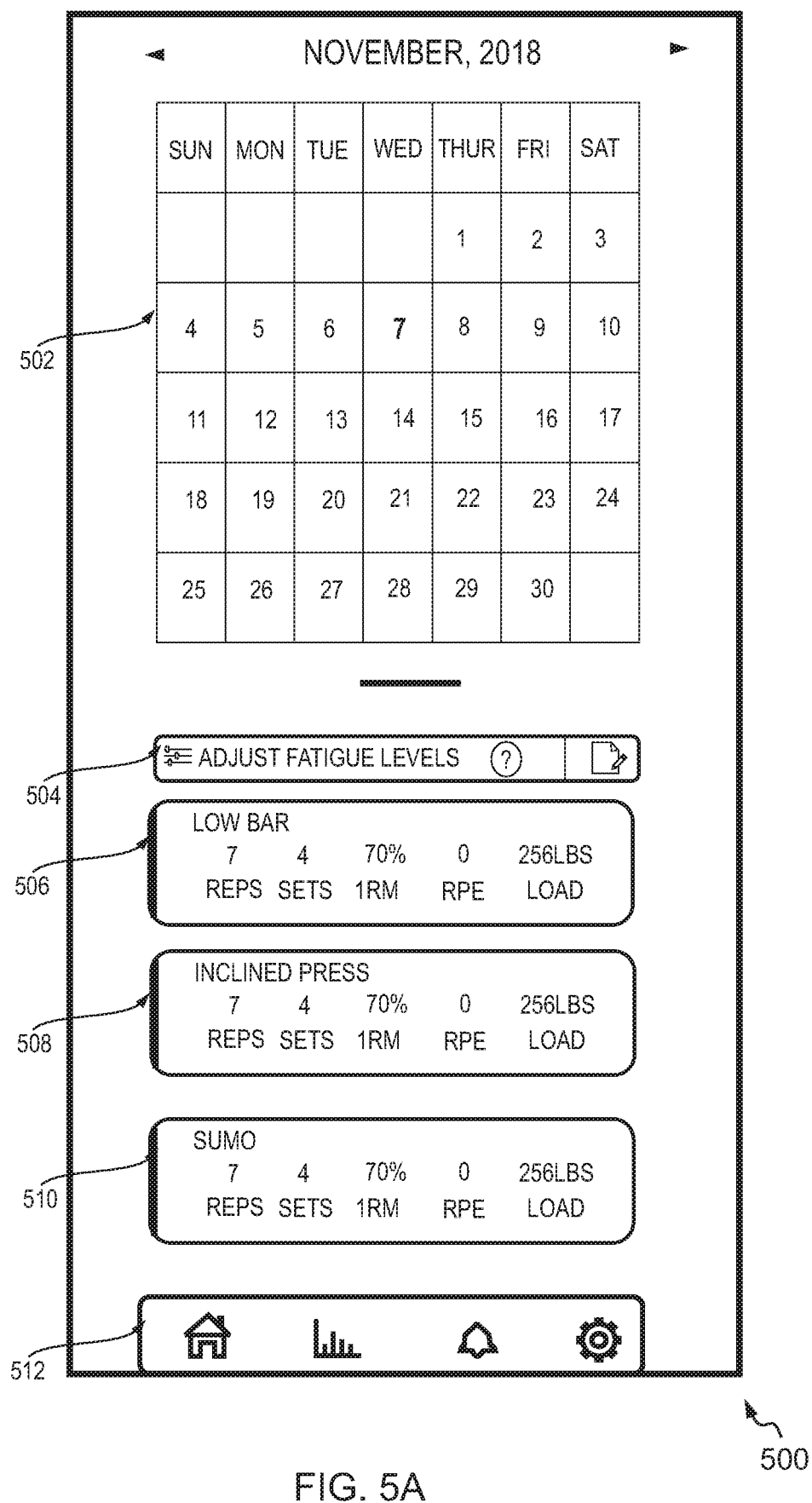
FIG. 5A shows an example representation of a UI displayed to a user on a user device depicting a fitness plan of a user for a day, in accordance with an example embodiment.

FIG. 5A shows an example representation of a UI 500 displayed to a user on a user device depicting a fitness plan of a user for a day, in accordance with an example embodiment. The UI 500 may be a client interface of the automated fitness platform. The user may request for an instance of the automated fitness platform from a server, for example, the computing device 102. The automated fitness platform is further installed in the user device and upon invoking an icon associated with the automated fitness platform may present one or more UIs for the user. The UI 500 may be a home page of the client interface.

The UI 500 includes a calendar 502 highlighting a current day (7 Nov. 2018). It shall be noted that the user can select any other day by providing a selection input on a day or navigating between months and/or years. The UI 500 displays a fitness plan for the selected day in sections 506, 508, 510. The section 506 displays an exercise associated with text "Low Bar". The client has to perform 4 sets of 7 repetitions (7 reps) of the exercise (Low Bar) as indicated by the section 506 with a Repetition Max (RM) of 70%, a rate of Perceived Exertion (RPE) of 0 and a load of 256 lbs.

The section 508 displays an exercise associated with text "Inclined Press" that the client has to perform '4 sets' of '7 repetitions' with a training weight (load) of '256 lbs' at '70%' for 1 RM and '0' RPE. The section 510 displays an exercise associated with text "Sumo" that the client has to perform '4 sets' of '7 repetitions' with a training weight (load) of '256 lbs' at '70%' for 1 RM and '0' RPE. Moreover the UI 500 includes a fatigue tab 504 associated with text "Adjust Fatigue Levels". The client can access the fatigue tab to provide a fatigue information corresponding to the exercises and/or fitness plan for the week. It shall be noted that the fatigue tab 504 may be enabled after a predefined time, for example, a week after performing exercises in the fitness plan to receive a client feedback of the fitness plan. The fatigue information (client feedback) is used by the computing device 102 to adjusting the fitness plan of the client automatically. Acquiring the fatigue information is further explained with reference to FIG. 5B. The UI 500 also includes a task bar 512 at a bottom part of the UI 500. The task bar 512 provisions options for the client to (1) navigate to a home page, (2) view historical data, (3) view notifications and (4) modify settings.

Figure 5B:
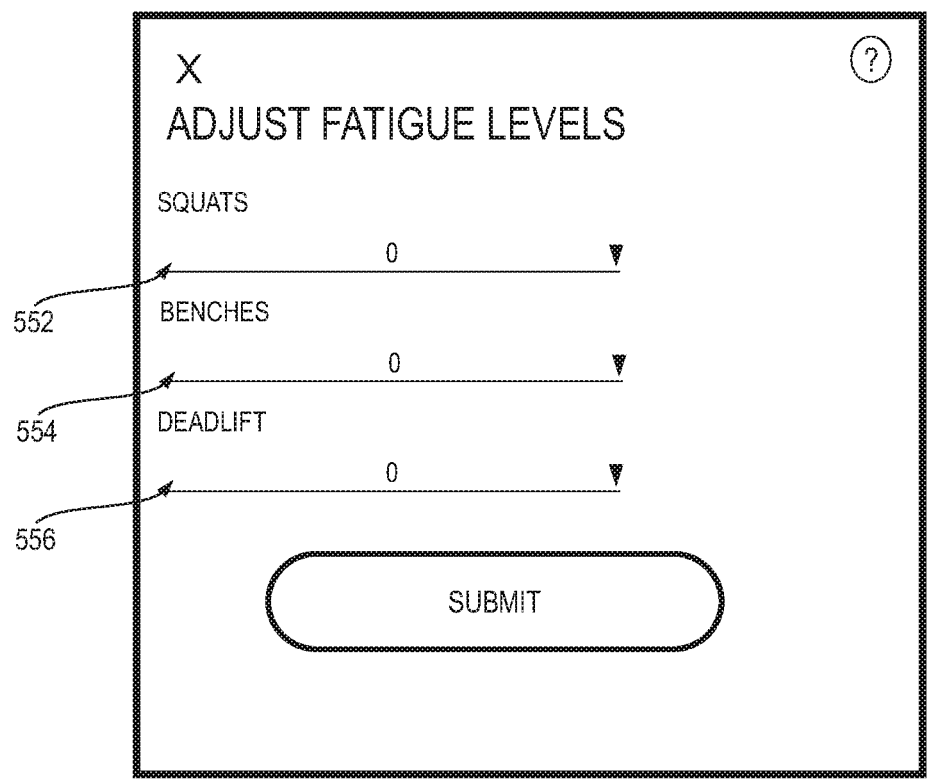
FIG. 5B shows an example representation of a UI displayed to a user on a user device for adjusting fatigue levels of a user based on a fitness plan, in accordance with an example embodiment.

FIG. 5B shows an example representation of a UI 550 displayed to a user on a user device for adjusting fatigue levels of a user based on a fitness plan, in accordance with an example embodiment. The fatigue information may be obtained from the user/client on a weekly/daily basis (also referred to as 'predefined time'). The tiredness or exhaustion of the client while performing exercises in the fitness plan is rated on a scale, for example, a scale of 1-5. The UI 550 includes a squat fatigue section associated with text "Squats", a benches fatigue section associated with text "Benches" and a deadlift fatigue section associated with text "deadlifts". The client can provide a fatigue experienced while performing squats in a textbox 552 associated with the squat fatigue section, a fatigue experienced while performing benches in a textbox 554 associated with the benches fatigue section and a fatigue experienced while performing deadlifts in a textbox 556 associated with the deadlift fatigue section. For example, if the client has to perform 7 reps of 4 sets with 256 lbs in squats and he experiences a fatigue of 5 (on a scale of 5), then he/she will provide a response of 5 in the textbox 552. The fatigue information may be used by the computing device 102 to adapt and modify the fitness plan based on the fatigue experienced by the client. In another embodiment, the fatigue information is obtained from the client in the form of responses to a questionnaire. The questionnaire is formulated by artificial intelligence.

Figure 6A:
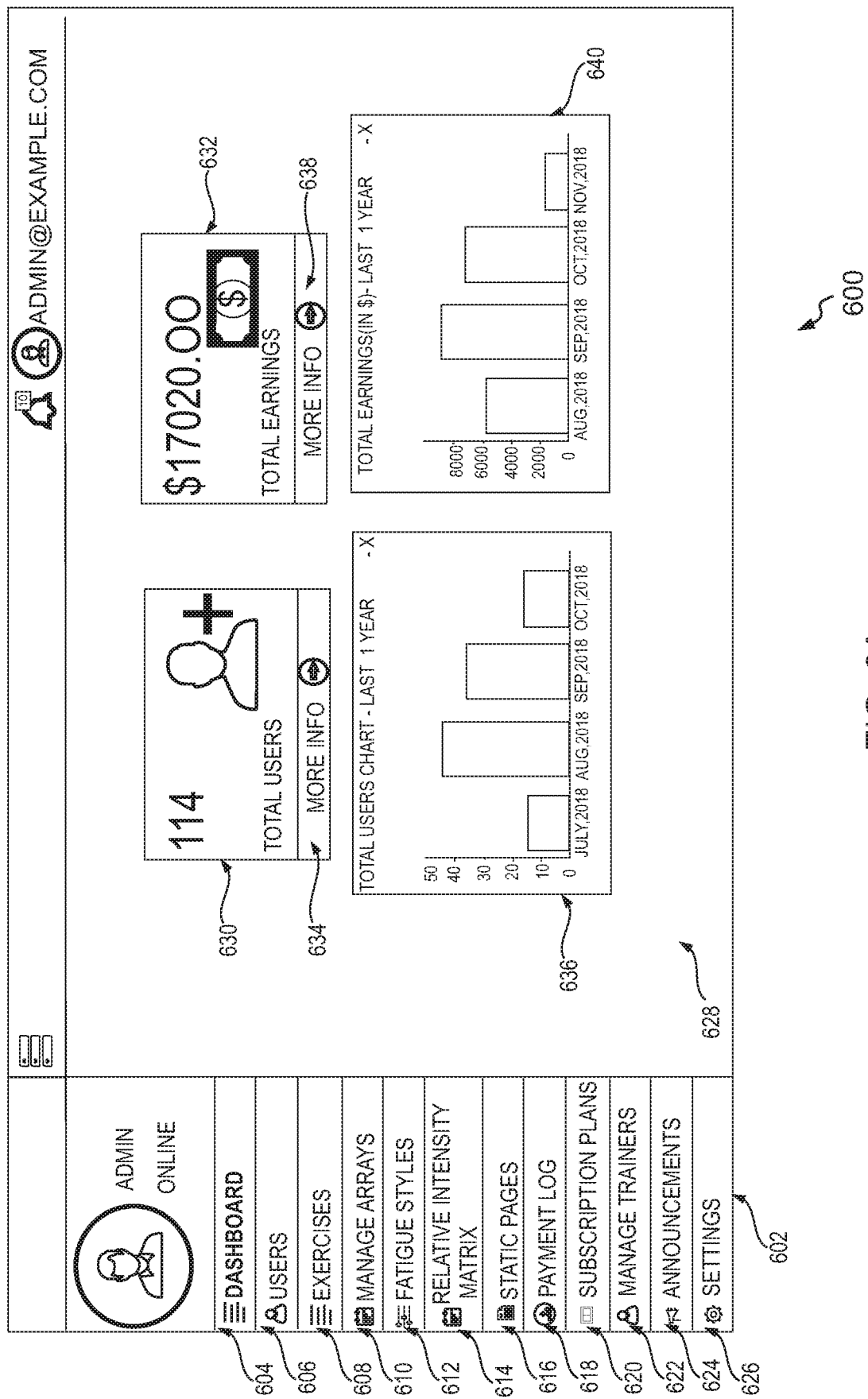
FIG. 6A shows an example representation of a UI displayed to an administrator (coach) managing fitness plans of one or more clients via a fitness platform, in accordance with an example embodiment.

FIG. 6A shows an example representation of a UI 600 displayed to an administrator (coach) managing fitness plans of one or more clients via a fitness platform, in accordance with an example embodiment. The UI 600 may be an administrator interface of the automated fitness platform. The administrator (e.g., the administrator 114) may request for an instance of the automated fitness platform from a server, for example, the computing device 102. The automated fitness platform is further installed in the administrator device (e.g., the device 116) and upon invoking an icon associated with the automated fitness platform may present one or more UIs for the administrator 114. In an example representation, the UI 600 may be a home page of the administrator interface.

The UI 600 comprises a task bar 602 at a left part of the UI 600. The task bar 602 includes a dashboard tab 604, a users tab 606, an exercises tab 608, a manage arrays tab 610, a fatigue styles tab 612, a relative intensity matrix tab 614, a static pages tab 616, a payment log tab 618, a subscription plans tab 620, a manage trainers tab 622, an announcements tab 624 and a settings tab 626. The administrator 114 can view anything by clicking on the corresponding tab. For example, the administrator 114 can view a dashboard 628 by clicking on the dashboard tab 604 and can view a user table (shown in FIG. 6B) including details of the registered users by clicking on the users tab 606. The dashboard 628 is displayed at a right part of the UI 600.

In an embodiment, the dashboard 628 displays statistics such as, a total user field 630 and a total earning field 632 for the administrator 114. The total user field 630 displays a number of total users that have used the automated fitness platform for a time duration, for example, a past year. A more info button 634 is provided below the total user field 630. Clicking on the more info button 634 will display a user chart 636 depicting month wise details of users using the automated fitness platform. The total earning field 632 displays a total earning for the last one year. A more info button 638 is provided below the total earning field 632. Clicking on the more info button 638 will display an earning chart 640 including month wise earning details of the administrator 114 or coach using the automated fitness platform for providing fitness plans to one or more clients. Revenue generated by distributing fitness plans to clients is graphically depicted for each month of the last year on the earning chart 640.

Figure 6B:
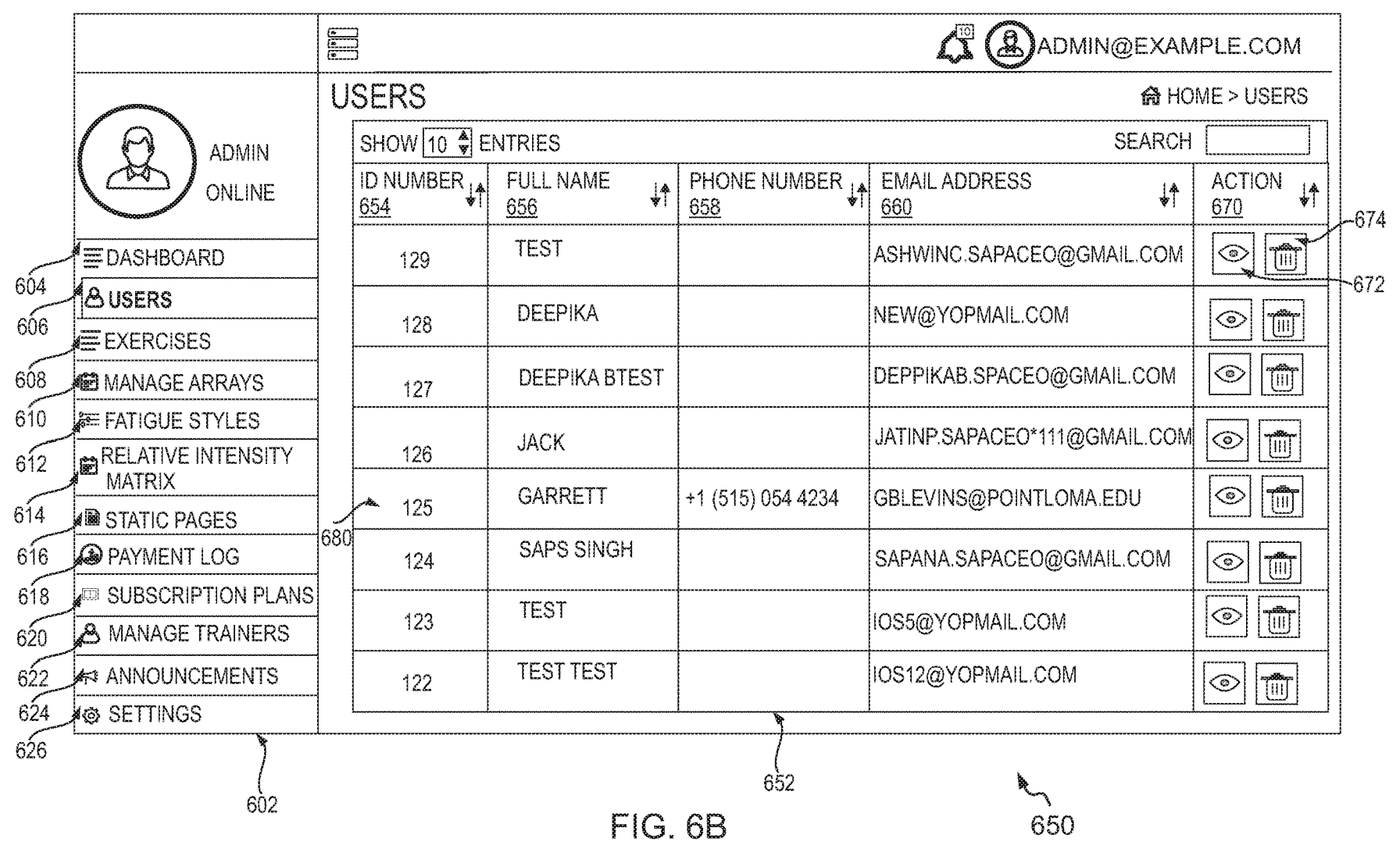

FIG. 6B shows an example representation of a UI 650 displaying a list of clients managed by the administrator of the fitness platform, in accordance with an example embodiment. The UI 650 is displayed to the administrator 114 on the administrator interface when the administrator 114 clicks on the users tab 606 of the task bar 602 (shown in the UI 600).

The UI 650 displays the task bar 602 at a left side and a user table 652 at the right side of the UI 650. The user table 652 displays basic information of each user of the automated fitness platform in a tabular format. The user table 652 includes fields such as an ID number field 654, a full name field 656, a phone number field 658, an email address field 660 and an action field 670. The ID number field 654 displays an identifier (ID) of the user registered with the fitness platform. For example, each user/client may be assigned a unique identifier for reference and the unique identifiers of the users/clients are displayed under the ID number field 654. Similarly, the full name field 656 displays the full name/registered name of the user, the phone number field 658 displays a contact number of the user, and the email address field 660 displays an email-id of the user. The action field 670 includes a view icon 672 and a delete icon 674. The administrator 114 can view detailed information of the user by clicking on a corresponding view icon 672 and can delete the entry of the user from the automated fitness platform by clicking on a corresponding delete icon 674. As an example, row 680 depicts a user names "GARRETT" associated with an identifier "125", reachable over phone with contact number "+1 (515) 054 4234" and email identifier of "gblevins@pointloma.edu".

FIG. 7A shows an example representation of a UI 700 for managing accessories required by the user for performing exercises in the fitness plan, in accordance with an example embodiment. In an example, the administrator 114 may provide a selection input on the exercise tab 608 in the task bar 602 which provisions the administrator 114 with options for managing fields such as, accessories required for performing an exercise, categories of exercise, exercise routines and daily exercise. As shown in FIG. 7A, when the administrator 114 clicks on the exercise tab 608, four icons i.e. an accessories icon 702, a categories icon 704, an exercises icon 706 and a daily exercises icon 708 are displayed to the administrator. Selecting any icon from the four icons (702-708) will display a corresponding page. The UI 700 is displayed to the administrator 114 when the administrator 114 clicks on the accessories icon 706 provided under the exercise tab 608 of the task bar 602. The UI 700 displays the task bar 602 on a left side and an accessory page 710 on a right side of the UI 700.

The accessory page 710 displays details of the accessories required by the user for performing exercises in the fitness plan and provide option to the administrator for managing the accessories required for each exercise. For example, the administrator can add and define new accessories for exercises, delete/remove accessories required for an exercise and modify/change accessories required for performing a particular exercise.

The accessory page 710 includes a search bar 712 provided at a top, the accessory table 714 provided in middle and a new accessory tab 716 provided at a bottom of the accessory page 710. The search bar 712 can be used by the administrator to search for an accessory. The accessory table 714 displays the details of the accessories already defined by the administrator and stored in the automated fitness platform and include an ID field 718, a name field 720 and an action field 721. For example, each accessory that is defined by the administrator 114 includes a name (shown in name field 720), an identifier (shown in the ID field 718) and actions that may be performed for that corresponding accessory (shown by the actions field 721). The ID field 718 displays the ID of the accessory and the name field 720 displays the name of the accessory. The action field 721 includes an edit icon 722, a view icon 723 and a delete icon 724. The administrator 114 can edit the details of the accessory by clicking on a corresponding edit icon 722, can view the details of the accessory by clicking on a corresponding view icon 723 and can delete the entry of the accessory from the automated fitness platform by clicking on a corresponding delete icon 724. Clicking on the new accessory tab 716 will provide an option for the administrator 114 to add create and define details of a new accessory in the automated fitness platform.

Figure 7B:
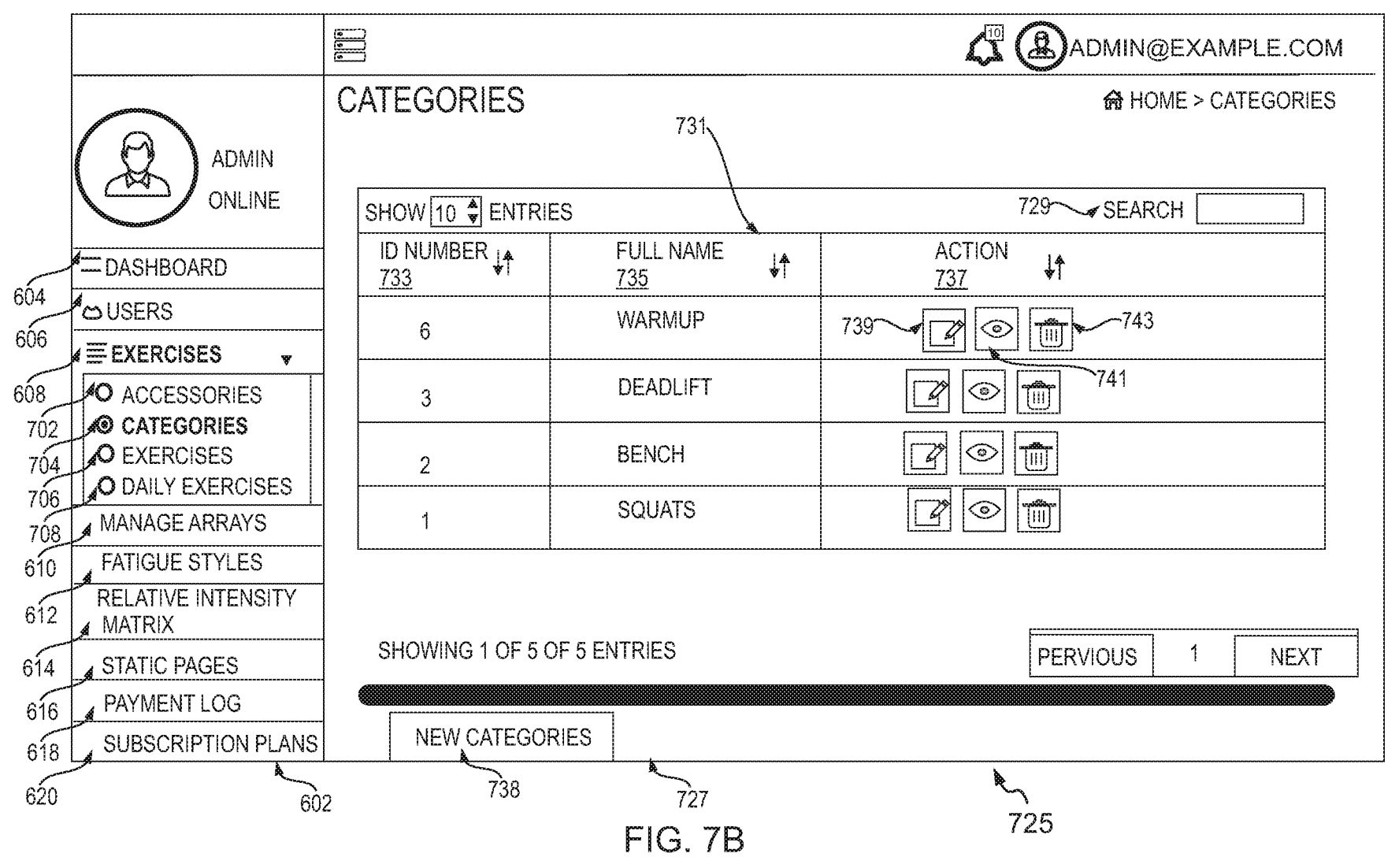

FIG. 7B shows an example representation of a UI 725 for managing categories of exercises assigned to the user in the fitness plan, in accordance with an example embodiment. The UI 725 is displayed to the administrator when the administrator 114 selects the categories icon 704 of the exercise tab 608 present in the task bar 702.

The UI 725 displays the task bar 602 on a left side and a category page 727 on the right side of the UI 725. The categories icon 704 will be highlighted in the exercises tab 608 of the task bar 602. In an embodiment, the category page 727 includes a search bar 729 provided at a top, a category table 731 provided in middle and a new category tab 733 provided at a bottom of the category page 727. The search bar 729 can be used by the administrator 114 to search for a category of exercise in already defined and stored in the automated fitness platform. The category page 727 may be used by the administrator to manage different categories of exercises, for example, warm up, squats, deadlift, and the like. It shall be noted that the term "manage" includes defining new categories, editing/modifying existing categories, and deleting existing categories of exercises. The category table 731 displays details of the categories of exercises defined and stored in the automated fitness platform and include an ID field 733, a name field 735 and an action field 737. The id field 733 displays the ID of the category of exercise and the name field 735 displays the name of the category of exercise. The action field 737 includes an edit icon 739, a view icon 741 and a delete icon 743. The administrator 114 can edit the details of a category of exercise by clicking on a corresponding edit icon 739, can view the details of the category of exercise by clicking on a corresponding view icon 741 and can delete the entry of a category of exercise from the fitness platform by clicking on a corresponding delete icon 743. Clicking on the new category tab 733 will provide an option for the administrator 114 to define and add details associated with a new category of exercise in the fitness platform.

FIG. 7C shows an example representation of a UI 745 for managing exercises assigned to the user in the fitness plan, in accordance with an example embodiment. The UI 745 is displayed to the administrator 114 when the administrator 114 selects the exercise icon 706 of the exercise tab 608 present in the task bar 702. The exercise icon 706 will be highlighted in the exercise tab 608 of the task bar 602.

The UI 745 displays the task bar 602 on a left side and an exercise page 747 on the right side of the UI 745. The exercise page 747 includes a select category tab 750 and a search tab 751. The select category tab 750 may be used by the administrator 114 to select a category of exercise from a list of categories already created and stored in the automated fitness platform. The select category tab is a drop down menu including names of categories of exercises, such as squats, deadlift, bench etc. The administrator 114 can select any category from the drop down menu by clicking on the select category tab 750. Alternatively, the administrator 114 can perform a search for a specific category/miss points in a category using a search string in the search tab 751.

The exercise page 747 includes an exercise table 752. The exercise table 752 displays the exercises listed under the category selected in the select category tab 750. If a category is not selected, the exercise table 752 will display all the exercises listed under various categories present in the automated fitness platform. The exercise table 752 includes an ID field 753, an exercise ID number field 754, an exercise name field 755, a category field 756, a style field 757, a miss point field 758, an accessory field 759 and an action field 760. The ID field 753 displays the ID of an exercise included in a corresponding selected category, the exercise ID number field 754 displays the exercise ID number of that particular exercise, the name field 755 displays the name of the exercise, the category field 756 displays the category under which this exercise is placed, the style field 757 displays style of the exercise, the miss point field 758 includes possible miss points if any while performing that exercise and the accessory field 759 display the accessory that may be required for performing that exercise. The action field 760 includes an edit icon 761, a view icon 762 and a delete icon 763. The administrator 114 can manage the exercises, for example, create/define a new exercise of a category for a miss point and/or edit/modify an exercise of an category performed using an accessory for a miss point by clicking on the corresponding edit icon 761. The administrator 114 will be redirected to an edit exercise page (explained with reference to FIG. 7D) on clicking the edit icon 761. Further, the administrator 114 can view the details of the exercise by clicking on a corresponding view icon 762 and can delete the entry of the exercise within the category from the fitness platform by clicking on the corresponding delete icon 763. As an example, row 764 includes an exercise "Low Bar" associated with an ID "24" and exercise ID number "SQ 22" belonging to a category "Squats" and the miss point is "I do not know" and requires no accessory. As seen from the table 752, exercises may vary with different miss points, for example, exercise with exercise ID "SQ 21" may be assigned for a person who mentions miss point as "In the hole" for squats in the initial questionnaire and an exercise with exercise identifier "SQ 20" may be assigned for a person who mentions miss point as "just above parallel" for squats in the initial questionnaire.

Figure 7D:
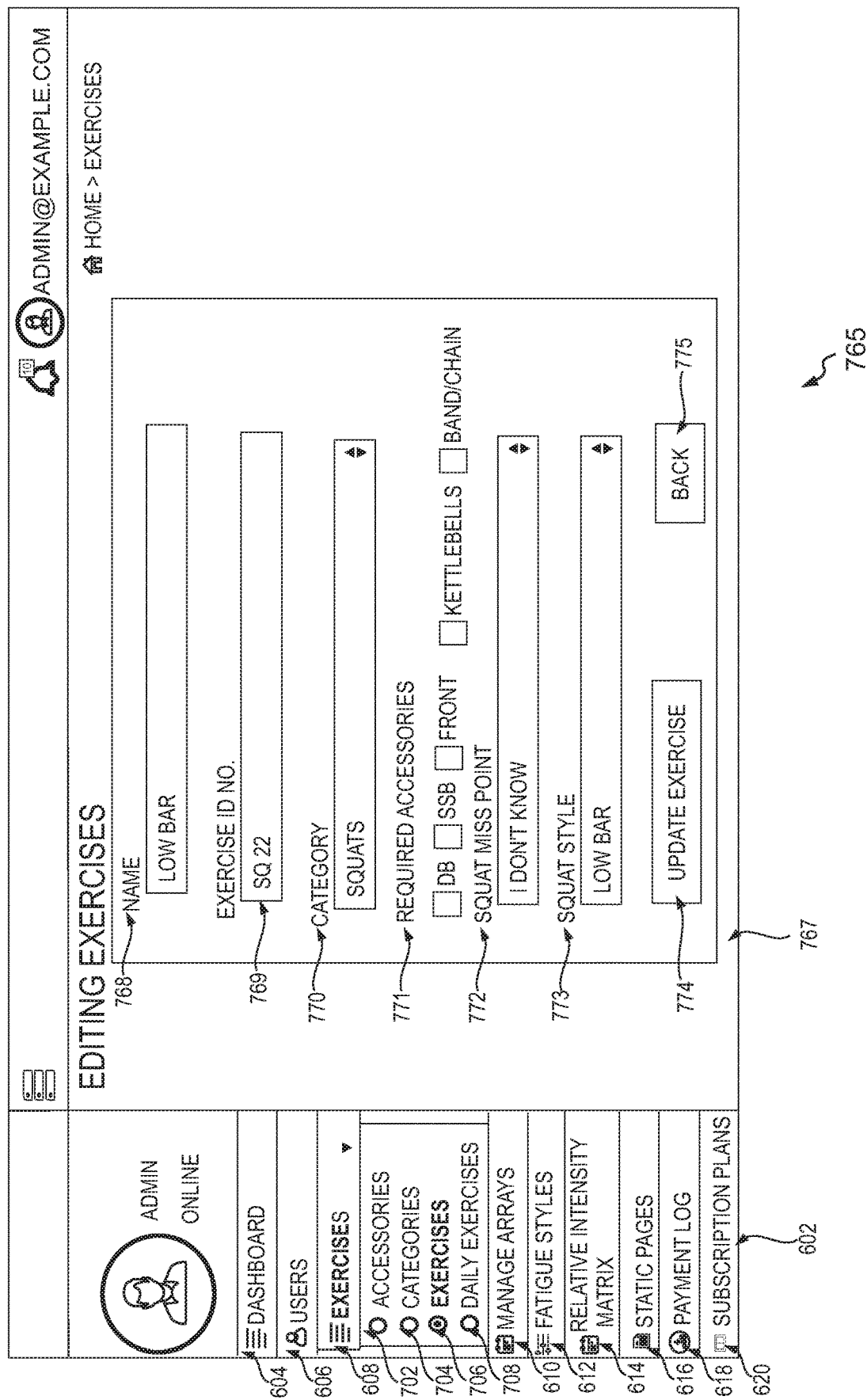
FIG. 7D shows an example representation of a UI for editing an exercise assigned to the user in the fitness plan, in accordance with an example embodiment.

FIG. 7D shows an example representation of a UI 765 for editing an exercise in the administrator interface of the automated fitness platform, in accordance with an example embodiment. The UI 765 is displayed to the administrator 114 when the administrator 114 clicks the edit icon 761 provided under the action field 760 of the exercise table 752 displayed in the UI 745.

The UI 765 displays the task bar 602 on a left side and an edit exercise page 767 on the right side of the UI 765. The edit exercise page 767 includes a name field 768, an exercise ID field 769, a category field 770, a required accessory field 771, a squat miss point field 772, a squat style field 773, an update exercise tab 774 and a back button 775. It shall be noted that input/data provided by the administrator 114 in the fields (768-773) shall be displayed in the fields (753-759). The name of the exercise that the administrator 114 wants to edit will be prewritten in the name field 768 but the administrator 114 can change the name written in the name field 768. Similarly, exercise ID number and the category of the exercise will be prewritten in the exercise id field 769 and the category field 770, respectively. The category field 770 includes a drop down menu comprising a plurality of categories, such as squats, deadlift etc., that are predefined in the fitness platform. The admin can select any category from the drop down menu while editing the exercise.

A plurality of accessories, such as DB, SSB, kettle bells, band etc., is defined under the required accessory field 771. The user can select one or more accessories from the plurality of accessories that the administrator/coach thinks will be needed for performing the exercise. The squat miss point field 772 includes a drop down menu comprising a plurality of miss point options, such as 'I don't know', 'just above parallel' etc., that are predefined in the fitness platform. The administrator 114 can select any miss point option from the drop down menu while editing the exercise. Similarly, the squat style field 773 includes a drop down menu comprising a plurality of style options, such as 'low bar', 'Conventional etc., that are predefined in the fitness platform. The administrator 114 can select any style option from the drop down menu while editing the exercise.

In an embodiment, clicking on the update exercise tab 774 will save the details provided in the fields (768-773) for the selected exercise and clicking on the back button 775 will redirect the administrator 114 to the UI 745 shown in FIG. 7C.

Figure 7E:
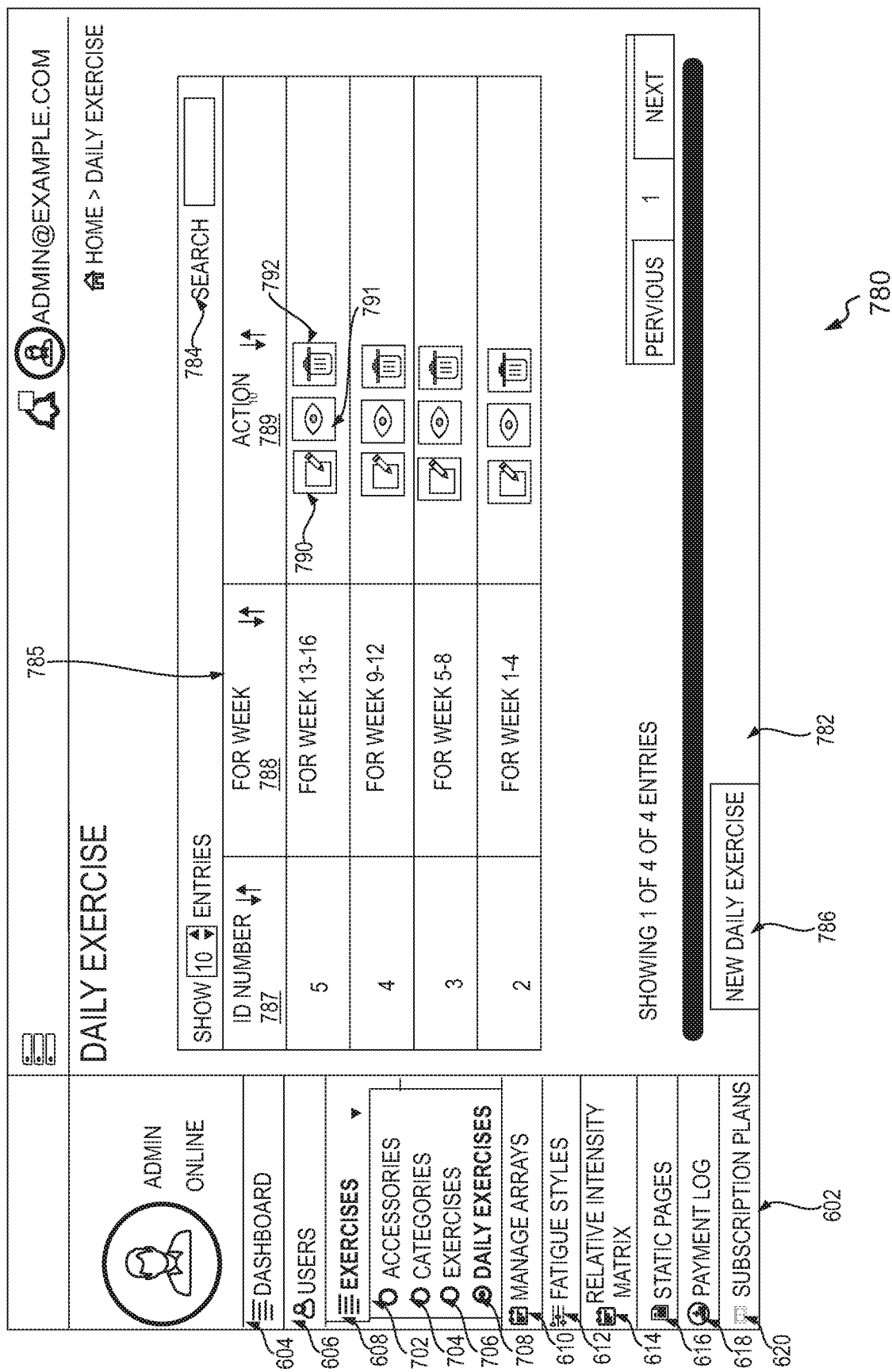
FIG. 7E shows an example representation of a UI for managing daily exercises assigned to the user in the fitness plan, in accordance with an example embodiment.

FIG. 7E shows an example representation of a UI 780 for managing daily exercises assigned to the user in the fitness plan, in accordance with an example embodiment. The UI 780 is displayed to the administrator 114 when the administrator 114 selects the daily exercise icon 708 of the exercise tab 608. The daily exercise icon 708 will be highlighted in the exercise tab 608 of the task bar 602.

The UI 780 displays the task bar 602 on a left side and a daily exercise page 782 on a right side of the UI 780. In an embodiment, the daily exercise page 782 includes a search bar 784 provided at a top, a daily exercise table 785 provided in middle and a new daily exercise tab 786 provided at a bottom of the daily exercise page 782. The search bar 784 can be used by the administrator 114 to search for daily exercises in a specified week in the fitness platform. The daily exercise table 785 displays the weekly distribution of the exercises as per the goal set by the user. The daily exercise table 785 includes an ID field 787, a week field 788 and an action field 789. The ID field 787 displays an identifier for an exercise assigned for a set of weeks and the week field 788 displays categorization of weeks as per the plan. The action field 789 includes an edit icon 790, a view icon 791 and a delete icon 792. The administrator 114 can edit the details of weekly exercises as per the categorization of weeks by clicking on the corresponding edit icon 790, can view the details of the weekly exercises by clicking on the corresponding view icon 791 and can delete a plan of exercise during the duration of week from the fitness platform by clicking on a corresponding delete icon 792. The administrator 114 will be redirected to an edit daily exercise page (explained with reference to FIG. 7F) on clicking the edit icon 790. Clicking on the new daily exercise tab 786 will provide an option for the administrator 114 to add new weekly distribution and define a new daily exercise for the new weekly distribution in the fitness platform.

Figure 7F:
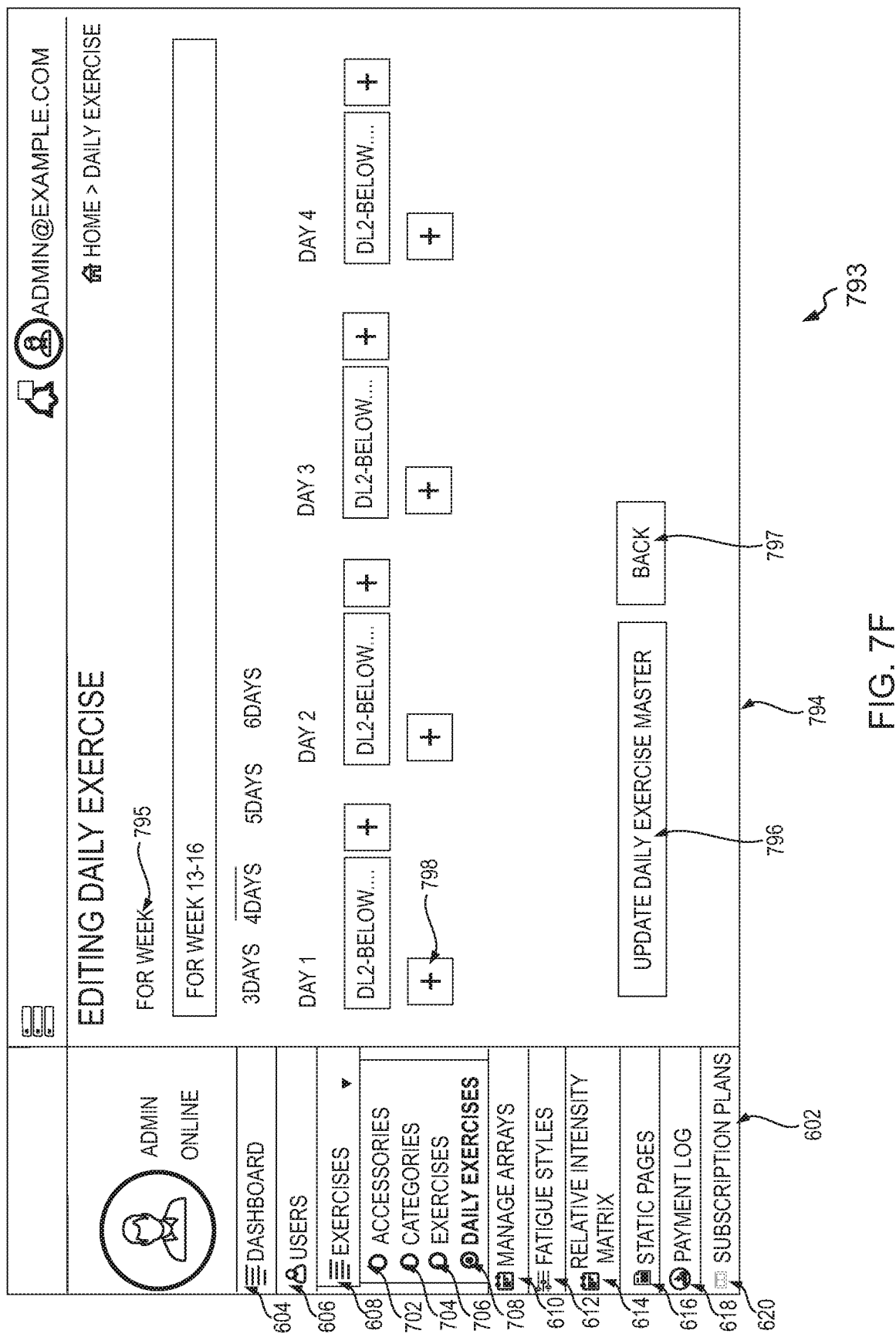
FIG. 7F shows an example representation of a UI for editing daily exercises assigned to the user in the fitness plan, in accordance with an example embodiment.

FIG. 7F shows an example representation of a UI 793 for editing daily exercises assigned to the user in the fitness plan, in accordance with an example embodiment. The UI 793 is displayed to the administrator 114 when the administrator 114 clicks the edit icon 790 provided under the action field 789 of the daily exercise table 785 (see, UI 780).

The UI 793 displays the task bar 602 on a left side and an edit daily exercise page 794 on a right side of the UI 793. In an embodiment, the daily exercise page 794 includes a week field 795, an update daily exercise master button 796 and a back button 797. The week field 795 includes a drop down menu comprising a plurality of categorization of weeks, such as, 'for week 13-16', 'for week 9-12, etc., those are predefined in the fitness platform. Once week category is selected in the week field 795, different plans (such as the 3 days/week plan, 4 days/week plan, 5 days/week plan, 6 days/week plan) that are available for the selected week category are displayed. The administrator 114 can select any plan from the different plan.

Once the plan is selected, an exercise plan for each day of the selected plan is displayed to the user. For example, as shown in the FIG. 7F, the administrator 114 has selected 4 days/week plan, so 4 tables (one for each day) are displayed to the admin A day number such as Day 1, Day 2 etc. is also mentioned above every table. The table displays the exercises included in the plan for that day and includes an add tab 798 with each table. The administrator 114 can add/define new exercises in the table for that particular day by clicking on the add tab 798 provided in the corresponding table.

In an embodiment, clicking on the update daily exercise master button 796 will save the details provided in each table for the selected plan and clicking on the back button 797 will redirect the administrator 114 to the daily exercise page 782 shown in FIG. 7E.

FIG. 8A shows an example representation of a UI 800 for managing a plurality of arrays in an electronic document, in accordance with an example embodiment. The UI 800 is displayed to the administrator 114 when the administrator clicks on the manage array tab 610 of the task bar 602 (shown in the UI 600).

The UI 800 displays the task bar 602 on a left side and an exercise array page 802 on a right side of the UI 800. In an embodiment, the exercise array page 802 includes a search bar 804 provided at a top, an exercise array table 806 provided in middle and a new exercise tab 808 provided at a bottom of the exercise array page 802. The search bar 804 can be used by the administrator 114 to search for an exercise array in the fitness platform. The exercise array table 806 displays the details of the plurality of exercise arrays available in the fitness platform and includes an ID field 810, a name field 812, a baseline type field 814, a goal type field 816, a no of weeks field 818 and an action field 820. The ID field 810 displays the ID of the exercise array, the name field 812 displays the name of the exercise array, the baseline type field 814 displays the type of the baseline of that exercise array, the goal type field 816 defines the the goal type for that exercise array, and the no of weeks field 818 displays the no of weeks available to the client for achieving the set goal.

The action field 820 includes an edit icon 822, a view icon 824 and a delete icon 826. The administrator 114 can edit the details of an exercise array by clicking on the corresponding edit icon 822. The administrator 114 will be redirected to edit exercise array page (explained with reference to FIG. 8B) on clicking the edit icon 822. Similarly, the administrator 114 can view the details of the selected exercise array by clicking on the corresponding view icon 824 and can delete the entry of the exercise array from the fitness platform by clicking on the corresponding delete icon 826. Clicking on new exercise tab 808 will provide an option to the administrator 114 to define/add a new exercise array in the fitness platform.

Figure 8B:
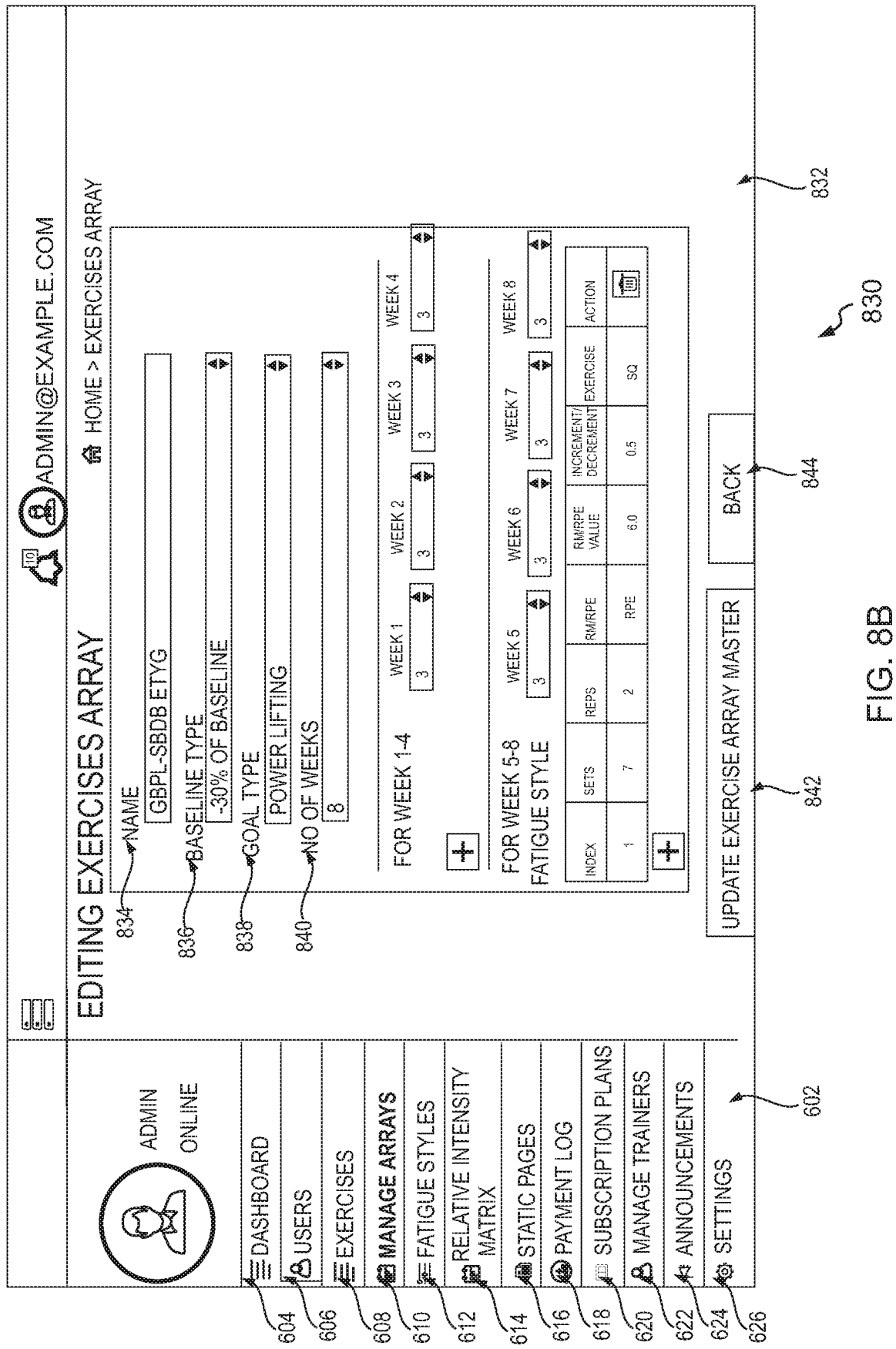
FIG. 8B shows an example representation of a UI for editing an array of the plurality of arrays in an electronic document, in accordance with an example embodiment.

FIG. 8B shows an example representation of a UI 830 for editing an array of the plurality of arrays in an electronic document, in accordance with an example embodiment. The UI 830 is displayed to the administrator 114 when the administrator 114 clicks on the edit icon 822 provided in the action field 820 of the exercise array page 802 shown in FIG. 8A.

The UI 830 displays the task bar 602 on a left side and an edit exercise array page 832 on a right side of the UI 830. The edit exercise array page 832 includes a name field 834, a baseline type field 836, a goal type field 838, a no. of weeks field 840, an update exercise array master tab 842 and a back button 844. The name field 834 displays the name of the exercise array selected for editing. The baseline type field 836 includes a drop down menu comprising a plurality of baseline types, such as 'baseline', '+10% of baseline', '−30% of baseline' etc. that are predefined in the fitness platform. Similarly, the goal type field 838 include a drop down menu comprising a plurality of goal types, such as 'power lifting, 'power building', 'strength training' etc. that are predefined in the fitness platform. The administrator 114 can select any goal type from the drop down menu while editing the exercise array. Further, the no. of weeks field 840 include a drop down menu for representing weeks that are available to client, such as '1, '2, etc. In an embodiment, the baseline type, the goal type and the number of weeks will be preselected in the baseline type field, goal type field 838 and the no. of weeks field 840, respectively.

In an embodiment, depending on the number of weeks that the client has for achieving the fitness goal, fitness plan set for all the weeks for the selected exercise array is displayed to the administrator 114 below the no. of weeks field 840. As shown in FIG. 8B, fitness plan for 'week 1-4' and for 'week 5-8' is displayed to the administrator 114 as the number of weeks available to client are 8 only. The fitness plan for each week is prepared based on the fatigue style of the client and the administrator 114 can edit the fitness plan by making changes in the displayed fitness plan. The UI 830 includes the fitness plan for weeks 1-4, 5-8 comprising exercise information such as, sets, reps, exercise, and intensity. The exercise information may be adapted/modified by the administrator 114 based on the fatigue information. For example, if the fatigue level of a user is high, then exercise information is modified/defined to include exercises of lesser intensity.

In an embodiment, clicking on the update exercise array master tab 842 will save the changes made by the admin in the edit exercise array page 832 and clicking on the back button 844 will redirect the administrator 114 to the exercise array page 802 shown in FIG. 8A.

Figure 9A:
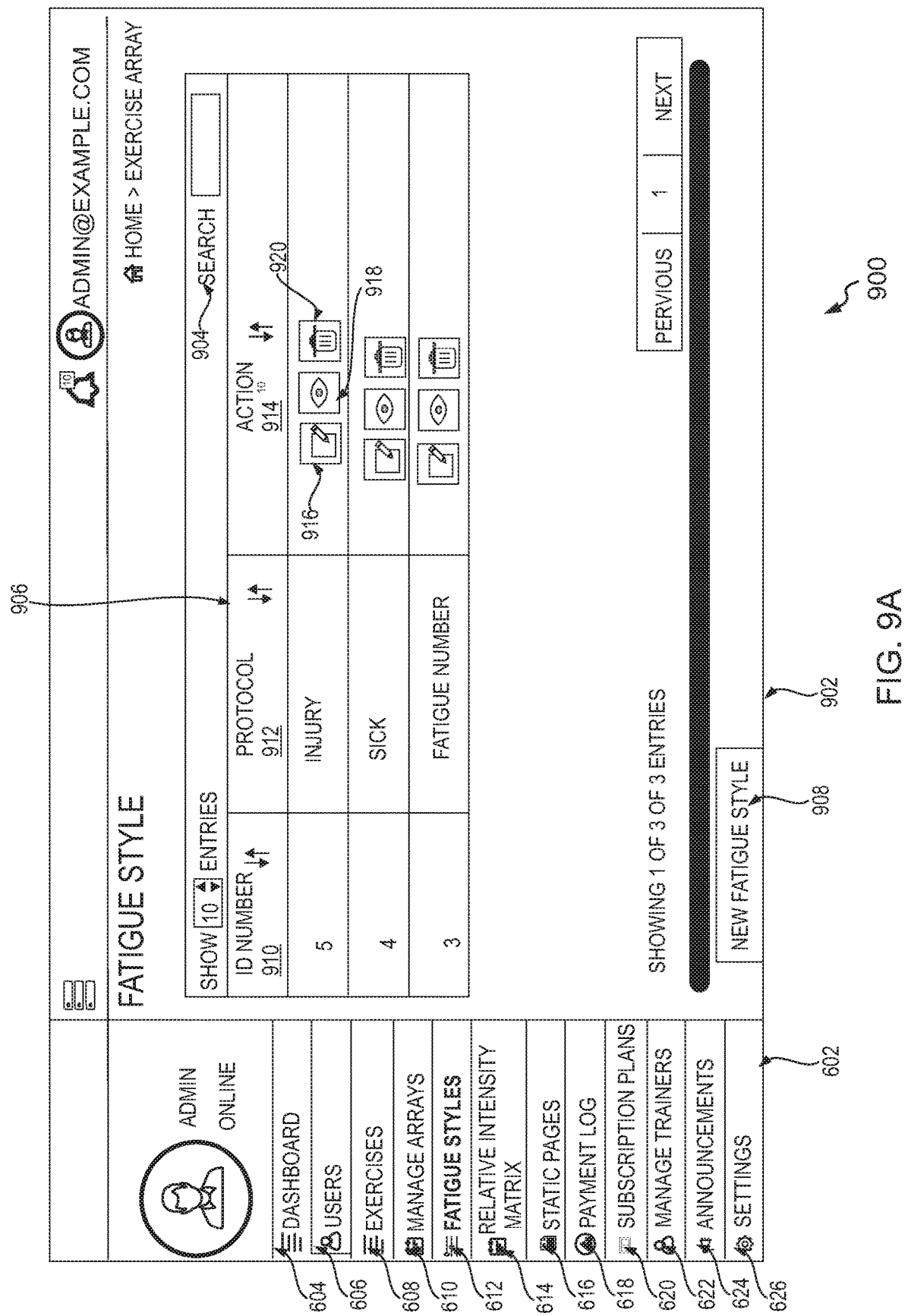
FIG. 9A shows an example representation of a UI for managing a fatigue style in the electronic document, in accordance with an example embodiment.

FIG. 9A shows an example representation of a UI 900 for managing exercises based on fatigue information in an electronic document, in accordance with an example embodiment. The UI 900 is displayed to the administrator when the administrator 114 clicks on the fatigue style tab 612 of the task bar 602 (shown in the UI 600).

The UI 900 displays the task bar 602 on a left side and a fatigue page 902 on a right side of the UI 900. In an embodiment, the fatigue page 902 includes a search bar 904 provided at a top, a fatigue table 906 provided in middle and a new fatigue style tab 908 provided at a bottom of the fatigue page 902. The search bar 904 can be used by the administrator 114 to search for a fatigue style in the fitness platform. The fatigue table 906 displays the details of the fatigue style listed in the fitness platform and include an ID field 910, a protocol field 912 and an action field 914. The ID field 910 displays an identifier for a fatigue style and the protocol field 912 displays the name of the fatigue style. The action field 914 includes an edit icon 916, a view icon 918 and a delete icon 920. The administrator 114 can edit the details of the fatigue style by clicking on the corresponding edit icon 916. The administrator will be redirected to edit fatigue style page (explained with reference to FIG. 9B) on clicking the edit icon 916. Similarly, the administrator 114 can view the details of the fatigue style by clicking on the corresponding view icon 918 and can delete the entry of the fatigue style from the fitness platform by clicking on the corresponding delete icon 920. Clicking on new fatigue style tab 908 will provide an option to the administrator 114 to add a new fatigue style in the fitness platform.

Figure 9B:
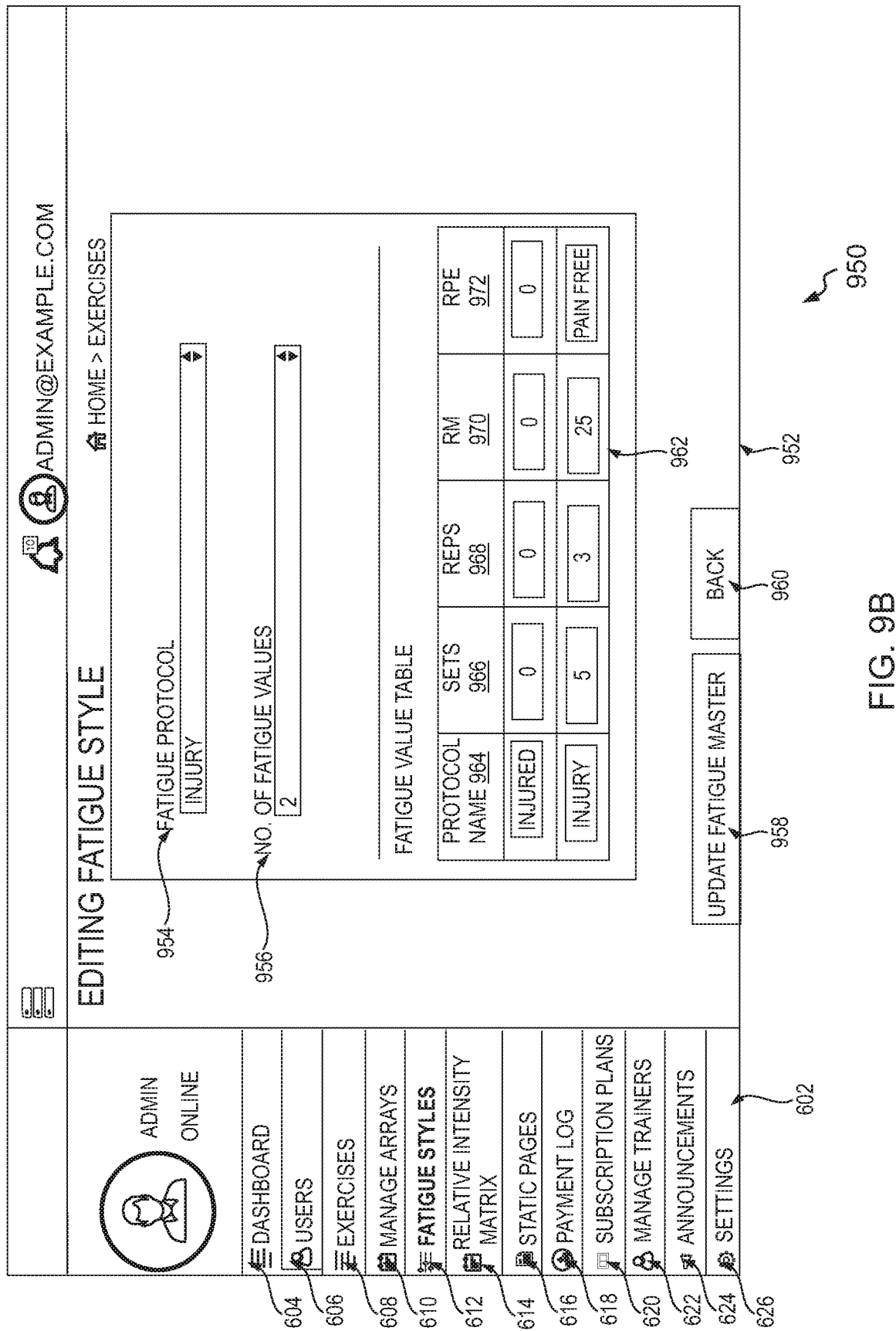
FIG. 9B shows an example representation of a UI for editing/defining a fatigue style in the electronic document, in accordance with an example embodiment.

FIG. 9B shows an example representation of a UI 950 for editing/defining a fatigue style in the electronic document, in accordance with an example embodiment. The UI 950 is displayed to the administrator 114 when the administrator 114 clicks on the edit icon 916 provided in the action field 914 of the fatigue page 902 shown in FIG. 9A.

The UI 950 displays the task bar 602 on a left side and an edit fatigue style page 952 on a right side of the UI 950. The edit fatigue style page 952 includes a fatigue protocol field 954, a fatigue value field 956, an update fatigue master tab 958 and a back button 960. The fatigue protocol field 954 includes a drop down menu comprising a plurality of fatigue styles, such as 'injury', 'sick' etc., that are predefined in the fitness platform. The administrator 114 can select any fatigue style from the drop down menu while editing the exercise. In an embodiment, the name of the fatigue style that the administrator 114 wants to edit will be preselected in the fatigue protocol field 954. The fatigue value field 956 displays numbers of fatigue values defined for the selected fatigue style. For example, as shown in FIG. 9B, for the fatigue style 'Injury', a fatigue value of '2' is defined in the fitness platform indicating that when user/client provides fatigue information (feedback) as '2' via the client interface of the automated fitness platform, exercises defined in a corresponding fatigue protocol are sent for the client. A fatigue value table 962 is also displayed below the fatigue value field 956. The fatigue value table 962 include number of rows depending upon the numbers of fatigue values defined for the selected fatigue style. The fatigue value table 962 includes a protocol name field 964, a sets field 966, a reps field 968, a Repetition Max (RM) field 970 and a rate of Perceived Exertion (RPE) field 972. The protocol name field 964 displays name of protocol defined in the fatigue style, such as injured now or recovery now etc. The sets field 966 displays the number of sets that the user can perform under the protocol, the reps field 968 displays the number of reps that the user can perform under the protocol, the RM field 970 displays the percentage of RM that the user can perform under the protocol and a RPE field 972 displays the load that the user can take while performing the exercise under the selected fatigue style.

In an embodiment, clicking on the update fatigue master tab 958 will save the details provided in the edit fatigue style page 952 and clicking on the back button 960 will redirect the administrator 114 to the fatigue page 902 shown in FIG. 9A.

FIG. 10 illustrates a block diagram of a computing device 1000, which may be an example of the computing device 102, in accordance with an embodiment of the present disclosure. The computing device 1000 includes a computer system 1002 and one or more databases.

The computer system 1002 includes a processor 1006 for executing instructions. Instructions may be stored in, for example, but not limited to, a memory 1008. The processor 1006 may include one or more processing units (e.g., in a multi-core configuration). The processor 1006 is operatively coupled to a communication interface 1010. The processor 1006 may also be operatively coupled to a database 1004. The database 1004 is any computer-operated hardware suitable for storing and/or retrieving data such as, episode definition parameters for a particular clinical episode. The database 1004 is also configured to store questionnaires and fitness plan generated for the one or more clients based on their response to the questionnaires. Further, the database 1004 may also include an electronic array document for managing the fitness plans of the one or more clients. The database 1004 may include multiple storage units such as hard disks and/or solid-state disks in a redundant array of inexpensive disks (RAID) configuration. The database 1004 may include, but not limited to, a storage area network (SAN) and/or a network attached storage (NAS) system or cloud storage. In some alternate embodiments, the database 1004 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc.

In some embodiments, the database 1004 is integrated within computer system 1002. For example, computer system 1002 may include one or more hard disk drives as database 1004. In other embodiments, database 1004 is external to computer system 1002 and may be accessed by the computer system 1002 using a storage interface 1012. The storage interface 1012 is any component capable of providing the processor 1006 with access to the database 1004. The storage interface 1012 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1006 with access to the database 1004.

The memory 1008 is a storage device embodied as one or more volatile memory devices, one or more non-volatile memory devices, and/or a combination of one or more volatile memory devices and non-volatile memory devices, for storing micro-contents information and instructions. The memory 1008 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The computing device 1000 as illustrated and hereinafter described is merely illustrative of a system that could benefit from embodiments of the invention and, therefore, should not be taken to limit the scope of the invention. It may be noted that the computing device 1000 may include fewer or more components than those depicted in FIG. 10. As explained above, the computing device 1000 may be included within or embody an electronic device. Moreover, the computing device 1000 may be implemented as a centralized system, or, alternatively, the various components of computing device 1000 may be deployed in a distributed manner while being operatively coupled to each other.

Figure 11:
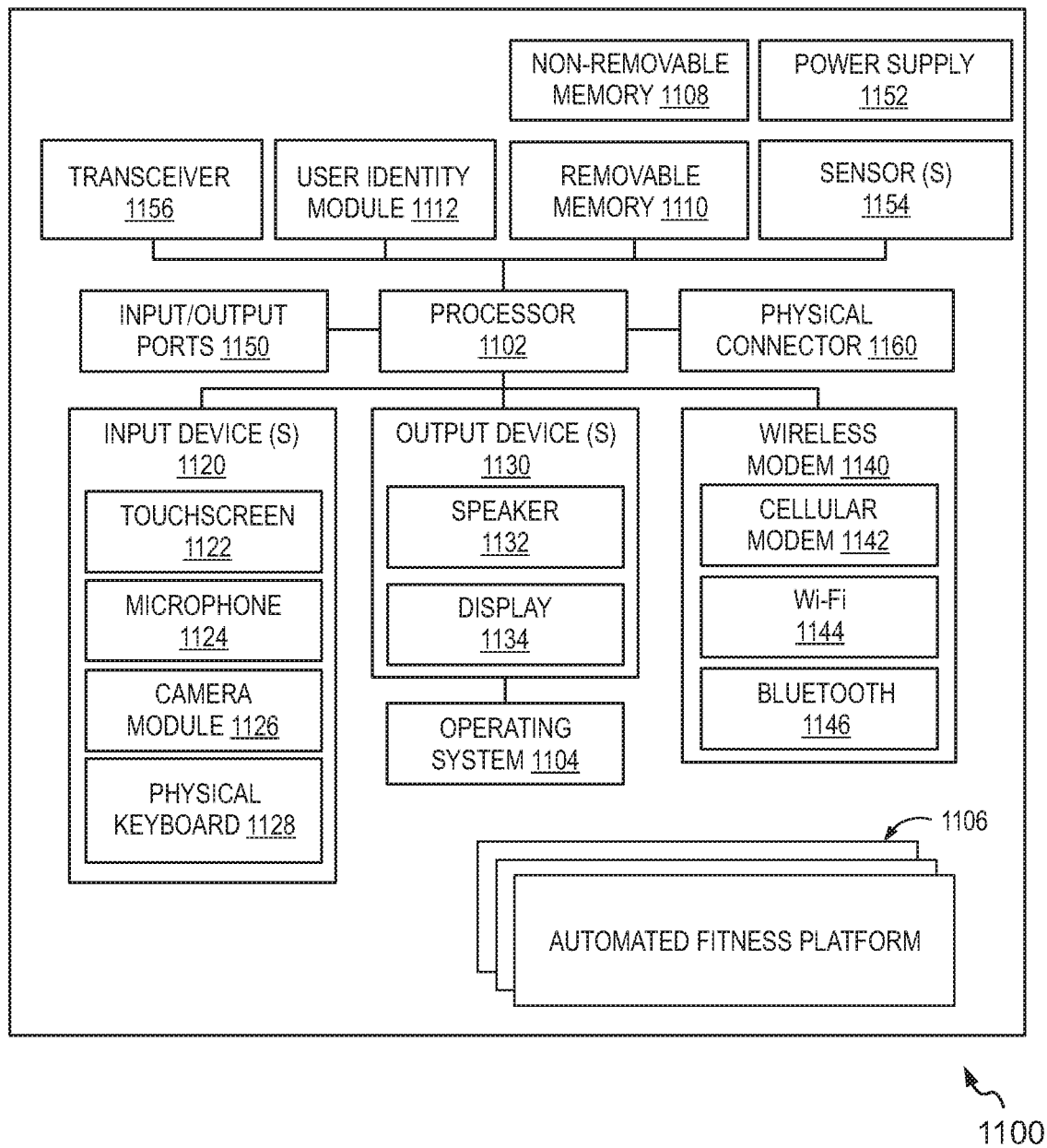
FIG. 11 is a block diagram of a user device, in accordance with an example embodiment.

FIG. 11 shows a simplified block diagram of a user device 1100 capable of implementing the various embodiments of the present disclosure. The user device 1100 may be an example of the device 116 or user devices 112A,112N (shown in FIG. 1). In an embodiment, the various operations related to automated coaching and distribution of fitness plans can be facilitated using an automated fitness platform installed in the user device 1100. The automated fitness platform when installed on devices 112A, 112N provision a client interface for the clients 110A, 110N, respectively and when installed on the device 116 provisions an administrator interface for the administrator 114. It should be understood that the user device 1100 as illustrated and hereinafter described is merely illustrative of one type of device and should not be taken to limit the scope of the embodiments. As such, it should be appreciated that at least some of the components described below in connection with that the user device 1100 may be optional and thus in an example embodiment may include more, less or different components than those described in connection with the example embodiment of the FIG. 11. As such, among other examples, the user device 1100 could be any of a mobile electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 control the allocation and usage of the components of the electronic device 1100 and support for one or more applications programs (see, the automated fitness platform) that implements one or more of the innovative features described herein. The applications 1106 may include the automated fitness management platform and common mobile computing applications (e.g., telephony applications, email applications, calendars, contact managers, web browsers, messaging applications such as USSD messaging or SMS messaging or SIM Tool Kit (STK) application) or any other computing application. The automated fitness management platform is configured to be in operative communication with other applications for example, through the OS or using API Calls, for providing automated coaching and distribution of fitness plans to one or more clients.

The illustrated user device 1100 includes one or more memory components, for example, a non-removable memory 1108 and/or a removable memory 1110. The non-removable memory 1108 and/or the removable memory 1110 may be collectively known as database in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data such as, eligibility files of a plurality of patients, claim requests and/or code for running the operating system 1104 and the episode management platform. The user device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1100 can support one or more input devices 1120 and one or more output devices 1130. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include but are not limited to a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the electronic device 1100 and a public switched telephone network (PSTN).

The user device 1100 can further include one or more input/output ports 1150, a power supply 1152, one or more sensors 1154 for example, an accelerometer, a gyroscope, a compass, or an infrared proximity sensor for detecting the orientation or motion of the electronic device 1100, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

A client may use the user device 1100 to provide responses to questionnaires and receive a fitness plan based on their respective responses to questionnaires via the client interface. The administrator 114 may manage one or more clients and the exercises assigned to the one or more clients via the administrator interface of the automated fitness platform installed on the device 1100.

Various example embodiments disclosed herein provide an automated coaching platform that distributes fitness plans to one or more clients based on their response to a questionnaire. The method can be applied to an unlimited number of clients thereby saving time exponentially when compared to other existing coaching methods. As the processing of client information is fast, more information can be gathered from the client without errors. Further, the implementation of artificial intelligence makes the fitness plan unique to each client's input. Moreover, the automation and tracking of training results allows for real-time updates. To replicate this level of service a coach would have to be available in real-time for clients which costs the coach time and the client money. Additionally, since the decisions can be pre-programmed and the data is automatically tracked more coaching decisions are possible than is common for online coaching. For example, the process of taking in subjective feedback for each training day, averaging it, and then adjusting the next week or cycle is time intensive, few coaches offer that level of detail in their services and those who do charge high prices because of the time it requires. Furthermore, the method described herein would be beneficial to large fitness companies (that distribute templates), training plans or coaches who have more client demand. Specifically, the method described herein would be favorable to those who have a large demand for custom coaching plans but do not have the time to write and monitor that many clients.

The disclosed systems and methods with reference to FIGS. 1 to 11, or one or more operations of the flow diagram 300 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application and\or implementation without departing from the spirit or scope of the claims.

What is claimed is:

1. A computer-implemented method for providing automated coaching, comprising:
   receiving, by a processor, a fitness related information from one or more clients in response to an initial questionnaire, the fitness related information comprising at least a meet details, a fitness goal, a fitness history, an exercise ability and a payment list;
   creating, by the processor, a plurality of arrays in an electronic document for each client of the one or more clients, wherein the plurality of arrays is configured to store the fitness related information;
   processing, by the processor, the fitness related information automatically to generate a fitness plan for each client of the one or more clients based on the plurality of arrays and a set of predefined rules, wherein the set of predefined rules are generated based on an artificial intelligence coaching logic and include at least one conditional statement that is evaluated based on a portion of the fitness related information stored in an array of the plurality of arrays; and
   distributing, by the processor, the fitness plan automatically through a personal communication to each client of the one or more clients.

2. The method as claimed in claim 1, further comprising:
   sending, by the processor, the initial questionnaire comprising one or more sections to a client device upon receiving a client request from a client of the one or more clients, wherein a subsequent section comprises questions based on a client response to questions in the one or more sections.

3. The method as claimed in claim 1, further comprising:
   receiving, by the processor, fatigue information of each client for the fitness plan after a predefined time; and
   adjusting, by the processor, the fitness plan of each client automatically based on the fatigue information, wherein the fatigue information is in form of a questionnaire.

4. The method as claimed in claim 1, wherein processing the fitness related information comprises:
   determining, by the processor, a training period based at least on a start date of the fitness plan and the meet details;
   upon determining the training period, determining, by the processor, a plurality of blocks based on the training period and the initial questionnaire, wherein each block of the plurality of blocks is associated with a set of variables;
   arranging, by the processor, the plurality of blocks in the fitness plan based on the set of predefined rules.

5. The method as claimed in claim 4, wherein the set of predefined rules facilitates selection of the plurality of blocks and the set of variables for the fitness plan.

6. The method as claimed in claim 4, wherein the plurality of blocks is one or more of:
   a preparatory block;
   an introductory block;
   a regular block; and
   a peaking block.

7. The method as claimed in claim 4, wherein the set of variables is one or more of:
   exercises;
   sets;
   reps; and
   intensity.

8. The method as claimed in claim 4, wherein ordering the plurality of blocks comprises:
   adapting, by the processor, the set of variables at least based on the fatigue information and the fitness goal.

9. The method as claimed in claim 1, wherein creating the plurality of arrays comprises:
   assigning, by the processor, a predefined formula for each array of the plurality of arrays in the electronic document for determining a set of variables for each client of one or more clients.

10. The method as claimed in claim 1, further comprising:
    receiving, by the processor, an injury report from a client device, the injury report comprising injury information associated with the client device;
    accessing, by the processor, a rehabilitation plan associated with the injury information; and
    sending, by the processor, the rehabilitation plan to the client device.

11. A computing device, comprising:
    a memory configured to store instructions; and
    a processor configured to execute the instructions stored in the memory and thereby cause the computing device to perform:
      receiving a fitness related information from one or more clients in response to an initial questionnaire, the fitness related information comprising at least a meet details, a fitness goal, a fitness history, an exercise ability and a payment list;
      creating a plurality of arrays in an electronic document for associated with the one or more clients, wherein the plurality of arrays is configured to store the fitness related information;
      processing the fitness related information to generate a fitness plan for a client of the one or more clients based on an array of the plurality of arrays and a set of predefined rules, wherein the set of predefined rules are generated based on an artificial intelligence coaching logic and include at least one conditional statement that is evaluated based on the fitness information stored in the array; and
      distributing the fitness plan to a client device assocaited with the client.

12. The computing device as claimed in claim 11, wherein the computing device is further caused to perform at least:
    sending the initial questionnaire comprising one or more sections to client device upon receiving a client request from the client, wherein a subsequent section comprises questions based on client responses to questions in the one or more sections.

13. The computing device as claimed in claim 11, wherein the computing device is further caused to perform at least:
receiving fatigue information of the client for the fitness plan after a predefined time; and
adjusting the fitness plan of the client based on the fatigue information, wherein the fatigue information is obtained based on a questionnaire.

14. The computing device as claimed in claim 11, wherein for processing the fitness related information, the computing device is caused to perform at least:
determining a training period based at least on a start date of the fitness plan and the meet details;
upon determining the training period, determining a plurality of blocks based on the training period and the initial questionnaire, wherein each block of the plurality of blocks is associated with a set of variables;
ordering, by the processor, the plurality of blocks in the fitness plan based on the set of predefined rules.

15. The computing device as claimed in claim 14, wherein the set of predefined rules facilitates selecting of the plurality of blocks and the set of variables for the fitness plan.

16. The computing device as claimed in claim 14, wherein for ordering the plurality of blocks, the computing device is caused to perform at least:
adapting the set of variables at least based on fatigue information and the fitness goal.

17. The computing device as claimed in claim 11, wherein for creating the plurality of arrays, the computing device is caused to perform at least:
assigning a predefined formula for each array of the plurality of arrays in the electronic document for determining a set of variables for each client of the one or more clients.

18. The computing device as claimed in claim 11, wherein the computing device is further caused to perform at least:
receiving an injury report from the client device, the injury report comprising injury information associated with the client;
accessing a rehabilitation plan associated with the injury information; and
sending the rehabilitation plan to the client.

19. A method, comprising:
receiving, by a processor, a fitness related information from one or more clients in response to an initial questionnaire, the fitness related information comprising at least a meet details, a fitness goal, a fitness history, an exercise ability and a payment list;
creating, by the processor, a plurality of arrays in an electronic document for each client of the one or more clients, wherein the plurality of arrays is configured to store the fitness related information and are linked to one or more existing arrays;
processing, by the processor, the fitness related information automatically to generate a fitness plan for each client of the one or more clients based on the plurality of arrays, the one or more existing arrays and a set of predefined rules, wherein the set of predefined rules are generated based on an artificial intelligence coaching logic and include at least one conditional statement that is evaluated based on the plurality of arrays and the one or more existing arrays;
distributing, by the processor, the fitness plan automatically through a personal communication to each client of the one or more clients; and
receiving a fatigue information of each client for the fitness plan after a predefined time; and
adjusting the fitness plan of each client based on the fatigue information, wherein the fatigue information is in a form of a questionnaire.

20. The method as claimed in claim 19, wherein processing the fitness related information comprises:
determining, by the processor, a training period based at least on a start date of the fitness plan and the meet details;
upon determining the training period, determining, by the processor, a plurality of blocks based on the training period and the initial questionnaire, wherein each block of the plurality of blocks is associated with a set of variables;
ordering, by the processor, the plurality of blocks in the fitness plan based on the set of predefined rules.

\* \* \* \* \*